United States Patent
Zhang et al.

(10) Patent No.: US 12,346,662 B2
(45) Date of Patent: Jul. 1, 2025

(54) ARTIFICIAL INTELLIGENCE-BASED SEMANTIC RECOGNITION METHOD, APPARATUS, AND DEVICE

(71) Applicant: HUAWEI TECHNOLOGIES CO., LTD., Shenzhen (CN)

(72) Inventors: Qing Zhang, Shenzhen (CN); Chang Liu, Beijing (CN); Ruidong Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 540 days.

(21) Appl. No.: 17/771,577

(22) PCT Filed: Jul. 30, 2020

(86) PCT No.: PCT/CN2020/105908
§ 371 (c)(1),
(2) Date: Apr. 25, 2022

(87) PCT Pub. No.: WO2021/082570
PCT Pub. Date: May 6, 2021

(65) Prior Publication Data
US 2022/0414340 A1    Dec. 29, 2022

(30) Foreign Application Priority Data
Oct. 31, 2019 (CN) .......................... 201911056617.4

(51) Int. Cl.
*G06F 40/35* (2020.01)
*G06F 16/3329* (2025.01)
*G06F 16/334* (2025.01)

(52) U.S. Cl.
CPC .......... *G06F 40/35* (2020.01); *G06F 16/3329* (2019.01); *G06F 16/3344* (2019.01)

(58) Field of Classification Search
CPC ... G06F 40/35; G06F 16/3329; G06F 16/3344
See application file for complete search history.

(56) References Cited

U.S. PATENT DOCUMENTS

| 2017/0004204 A1 | 1/2017 | Bastide et al. |
| 2019/0213999 A1 | 7/2019 | Grupen et al. |

(Continued)

FOREIGN PATENT DOCUMENTS

| CN | 106776553 A | 5/2017 |
| CN | 106777257 A | 5/2017 |

(Continued)

OTHER PUBLICATIONS

Ebrahimi, HotFlip: White-Box Adversarial Examples for Text Classification, 2018, arXiv, whole document (Year: 2018).*

(Continued)

*Primary Examiner* — Sonia L Gay
(74) *Attorney, Agent, or Firm* — Maier & Maier, PLLC

(57) ABSTRACT

An artificial intelligence-based semantic recognition method, apparatus, and device. In the artificial intelligence-based semantic recognition method, a pre-trained semantic recognition model is trained by using a training corpus configured by a developer on a model training platform such as a Bot platform and a negative corpus provided on the model training platform, where the negative corpus is extracted by mapping an encoding value of the training corpus to a negative corpus set. Therefore, the negative corpus is extracted based on the encoding value of the training corpus, and a randomized method for generating the negative corpus is changed into a stable method.

20 Claims, 11 Drawing Sheets

(56) References Cited

U.S. PATENT DOCUMENTS

2019/0325864 A1   10/2019   Anders et al.
2020/0058299 A1*   2/2020   Lee .................... G10L 15/1815
2020/0226212 A1*   7/2020   Tan ...................... G06F 18/214

FOREIGN PATENT DOCUMENTS

| CN | 107357838 A | 11/2017 |
|----|-------------|---------|
| CN | 108920622 A | 11/2018 |
| CN | 109214515 A | 1/2019 |
| CN | 109783820 A | 5/2019 |
| CN | 110162611 A | 8/2019 |
| EP | 2657852 A1 | 10/2013 |

OTHER PUBLICATIONS

Ilja Kuzborskij et al., "Data-Dependent Stability of Stochastic Gradient Descent", arXiv:1703.01678v4 [cs.LG], Feb. 15, 2018, pp. 1-22.

Andre Elisseeff et al., "Stability of Randomized Learning Algorithms", Journal of Machine Learning Research 6, 2005, pp. 55-79.

CCTV, [China Financial Report] Huawei is developing a voice assistant for overseas markets, https://tv.cctv.com/2018/11/16/VIDEG7hxNOlwhxUvazR6JDg4181116.shtml, 1 minute and 10 seconds, Nov. 16, 2018, 2 pages.

* cited by examiner

ARTIFICIAL INTELLIGENCE-BASED SEMANTIC RECOGNITION METHOD, APPARATUS, AND DEVICE

This application is a National Stage of International Application No. PCT/CN2020/105908, filed on Jul. 30, 2020, which claims priority to Chinese Patent Application No. 201911056617.4, filed Oct. 31, 2019, both of which are hereby incorporated by reference in their entireties.

TECHNICAL FIELD

Embodiments relate to the field of semantic recognition technologies in artificial intelligence, and to an artificial intelligence-based semantic recognition method, apparatus, and device.

BACKGROUND

A human-computer dialog system is a new generation human-computer interaction interface. A Bot platform is a model training platform. The Bot platform provides a platform for a developer to quickly build a capability, supports a skill of quickly building conversations by three-party service parties or the like, and is used to trigger interaction among service functions of the three-party service parties. The Bot platform provides a one-click triggering button for the developer to automatically train a skill model configured by the developer. When the developer retrains a model, a model obtained through retraining may be different from a model obtained through previous training, resulting in large confidence fluctuation. A corpus that can be recognized last time cannot be recognized in the model obtained through the retraining, or a corpus that cannot be recognized in the model obtained through the previous training can be recognized in the model obtained through the retraining. For a carefully tuned corpus, an indicator such as accuracy and/or a recall rate may fluctuate significantly, and therefore does not meet an expectation. Instability caused by retraining the model ultimately affects developer experience.

SUMMARY

Embodiments provide an artificial intelligence-based semantic recognition method, apparatus, and device, and further provide a computer-readable storage medium. In this way, when a training corpus is not added, deleted, or modified, models obtained through two or more times of training can remain almost the same, and therefore test corpora of a developer have almost same confidence (difference <0.01) in the models obtained through the plurality of times of training, to reduce accuracy fluctuation and improve developer experience.

According to a first aspect, an embodiment provides an artificial intelligence-based semantic recognition method, including: obtaining a query statement entered by a user;
recognizing the query statement by using a pre-trained semantic recognition model, to obtain an intent of the query statement, where the pre-trained semantic recognition model is trained by using a training corpus and a negative corpus, the negative corpus is extracted by mapping an encoding value of the training corpus to a negative corpus set, the training corpus is configured by a developer on a model training platform such as a Bot platform, and the negative corpus set is provided on the model training platform;
obtaining, based on the query statement and the intent of the query statement, a response corresponding to the query statement; and
displaying the response corresponding to the query statement.

According to the artificial intelligence-based semantic recognition method, the negative corpus is extracted based on the encoding value of the training corpus by using a mapping relationship. When the training corpus is not added, deleted, or modified, the encoding value of the training corpus remains unchanged, and the mapping relationship also remains unchanged. Therefore, the negative corpus extracted based on the encoding value of the training corpus by using the mapping relationship remains unchanged. Because the training corpus and the extracted negative corpus remain unchanged, a model obtained through training by using the training corpus and the negative corpus is highly stable. In this way, when the training corpus is not added, deleted, or modified, models obtained through two or more times of training can remain almost the same, and therefore test corpora of the developer have almost same confidence (difference <0.01) in the models obtained through the plurality of times of training, to reduce accuracy fluctuation and improve developer experience.

In a possible implementation, the obtaining a query statement entered by a user includes: obtaining a query statement entered by the user by using a text;
obtaining a query statement entered by the user by using a voice; or
obtaining a picture entered by the user and recognizing the picture to obtain a query statement included in the picture.

In other words, the user may enter the query statement by using the text, the voice, or the picture.

In a possible implementation, a training process of the semantic recognition model includes: grouping training corpora based on a quantity of negative corpora that need to be extracted; encoding all groups of training corpora to obtain encoding values of all groups of training corpora; extracting a first-type negative corpus and a second-type negative corpus based on the encoding values, where the first-type negative corpus may be a chit-chat negative corpus, and the second-type negative corpus may be a high-frequency positive vocabulary negative corpus; and performing training by using the training corpora, the first-type negative corpus, and the second-type negative corpus to obtain the semantic recognition model.

After each group of training corpora is obtained through grouping, each group of training corpora may be encoded, so that each group of training corpora has a unique encoding value. An encoding manner may include a manner based on a hash value, a simhash value, or the like.

Further, the training corpora may be further sorted before the training corpora are grouped based on the quantity of negative corpora that need to be extracted. For example, the training corpora may be sorted in the following sorting manner sorting the training corpora based on a character string, a hash value of the training corpora, a simhash value of the training corpora, or the like. Further, the training corpora may alternatively be sorted in another sorting manner. This is not limited in this embodiment. In this embodiment, the training corpora are sorted, so that when the training corpora are completely the same, the encoding value obtained after the grouping does not change with a corpus order, to ensure that the grouping of the training corpora does not change.

After the training corpora are grouped, all groups of training corpora are encoded, the first-type negative corpus and the second-type negative corpus are extracted based on the encoding values, and then training is performed by using the training corpora, the first-type negative corpus, and the second-type negative corpus to obtain the semantic recognition model. Therefore, the negative corpus is uniquely extracted based on the encoding value of the training corpus, and a randomized method for generating the negative corpus is changed into a stable generation method. In this way, when the training corpus is not added, deleted, or modified, models obtained through two or more times of training can remain almost the same, and therefore test corpora of the developer have almost same confidence (difference <0.01) in the models obtained through the plurality of times of training, to reduce accuracy fluctuation and improve developer experience.

In a possible implementation, the extracting a first-type negative corpus based on the encoding values includes: obtaining a first quantity of first-type negative corpora included in a first negative corpus set, where the first negative corpus set may be a chit-chat negative corpus set, and the first quantity is a total quantity of first-type negative corpora included in the first negative corpus set;
- obtaining a first sampling value of the first-type negative corpus based on the encoding values of all groups of training corpora and the first quantity, where the obtaining a first sampling value of the first-type negative corpus based on the encoding values of all groups of training corpora and the first quantity may be: obtaining a remainder by performing a modulo operation of division by the first quantity by using the encoding values of all groups of training corpora, using the modulo operation as a mapping relationship, and using the remainder as the first sampling value; and
- extracting a first-type first negative corpus from the first negative corpus set based on the first sampling value. The first negative corpus set may be searched based on the first sampling value, and the first negative corpus whose identifier (or index) matches the first sampling value is extracted.

In this embodiment, the first negative corpus is extracted based on the encoding value of the training corpus by using a mapping relationship. When the training corpus is not added, deleted, or modified, the encoding value of the training corpus remains unchanged, and the mapping relationship also remains unchanged. Therefore, the first negative corpus extracted based on the encoding value of the training corpus by using the mapping relationship remains unchanged. Because the training corpus and the extracted negative corpus remain unchanged, a model obtained through training by using the training corpus and the negative corpus is highly stable. In this way, when the training corpus is not added, deleted, or modified, models obtained through two or more times of training can remain almost the same, and therefore test corpora of the developer have almost same confidence (difference <0.01) in the models obtained through the plurality of times of training, to reduce accuracy fluctuation and improve developer experience.

In a possible implementation, after the extracting a first-type first negative corpus from the first negative corpus set based on the first sampling value, the method further includes:
- calculating a first similarity between the first negative corpus and the training corpus, where the training corpora herein include all positive corpora, that is, all positive training corpora configured on the model training platform; and
- if the first similarity is less than a first similarity threshold, determining that the first negative corpus is successfully sampled, and adding the first negative corpus to a sampling corpus set.

In a possible implementation, after the calculating a first similarity between the first negative corpus and the training corpus, the method further includes:
- if the first similarity is greater than or equal to the first similarity threshold, obtaining a second sampling value based on the first sampling value, where in an implementation, the second sampling value may be obtained by adding a preset value to the first sampling value;
- extracting a first-type second negative corpus from the first negative corpus set based on the second sampling value;
- calculating a second similarity between the second negative corpus and the training corpus; and
- if the second similarity is less than the first similarity threshold, determining that the second negative corpus is successfully sampled, and adding the second negative corpus to the sampling corpus set.

In a possible implementation, after the calculating a second similarity between the second negative corpus and the training corpus, the method further includes:
- if the second similarity is greater than or equal to the first similarity threshold, repeatedly performing a step of obtaining a second sampling value based on the first sampling value and subsequent steps; and
- when a quantity of repetition times is greater than a preset threshold of a quantity of repetition times, if a similarity between a negative corpus obtained through current sampling and the training corpus is less than a second similarity threshold, determining that the negative corpus obtained through the current sampling is successfully sampled, and adding the negative corpus obtained through the current sampling to the sampling corpus set; or if a similarity between a negative corpus obtained through current sampling and the training corpus is greater than or equal to a second similarity threshold, adding the negative corpus successfully sampled last time to the sampling corpus set again.

If a training corpus configured by the developer is similar to a corpus in the first negative corpus set, using the corpus as the negative corpus affects recognition of an intent of the training corpus and the intent of the training corpus is recognized as a negative intent or confidence in recognizing the intent of the training corpus as a positive intent is low. In this embodiment, a sampling corpus highly similar to the training corpus is eliminated, to avoid impact on the positive intent. In this embodiment, a negative corpus lowly similar to the training corpus may be added to the sampling corpus set, but a negative corpus highly similar to the training corpus is not added to the sampling corpus set.

In a possible implementation, the extracting a second-type negative corpus based on the encoding values includes: sequentially obtaining every M encoding values from the encoding values;
- selecting a second quantity of encoding values from every M obtained encoding values;
- extracting the second-type negative corpus from a second negative corpus set based on the second quantity of encoding values;
- sorting the encoding values;

sequentially obtaining every N encoding values from the sorted encoding values;

selecting a third quantity of encoding values from every N obtained encoding values; and extracting the second-type negative corpus from the second negative corpus set based on the third quantity of encoding values, where M and N are positive integers, and M≠N.

In this embodiment, the second negative corpus is extracted based on the encoding value of the training corpus by using a mapping relationship. When the training corpus is not added, deleted, or modified, the encoding value of the training corpus remains unchanged, and the mapping relationship also remains unchanged. Therefore, the second negative corpus extracted based on the encoding value of the training corpus by using the mapping relationship remains unchanged. Because the training corpus and the extracted negative corpus remain unchanged, a model obtained through training by using the training corpus and the negative corpus is highly stable. In this way, when the training corpus is not added, deleted, or modified, models obtained through two or more times of training can remain almost the same, and therefore test corpora of the developer have almost same confidence (difference <0.01) in the models obtained through the plurality of times of training, to reduce accuracy fluctuation and improve developer experience.

In a possible implementation, the extracting a first-type negative corpus and a second-type negative corpus based on the encoding values includes: obtaining a third sampling value of the first-type negative corpus and a fourth sampling value of the second-type negative corpus based on the encoding values of all groups of training corpora and a pre-learned mapping relationship; and extracting the first-type negative corpus from a first negative corpus set based on the third sampling value and extracting the second-type negative corpus from a second negative corpus set based on the fourth sampling value.

In a possible implementation, before the obtaining a third sampling value of the first-type negative corpus and a fourth sampling value of the second-type negative corpus based on the encoding values of all groups of training corpora and a pre-learned mapping relationship, the method further includes:

obtaining a training sample pair, where the training sample pair includes an encoding value of a training corpus and a sampling value of a corresponding negative corpus, and a distance between sampling values of negative corpora corresponding to training corpora meets a preset constraint distance; and learning a mapping relationship by using the training sample pair, where the mapping relationship includes a mapping relationship between the encoding value of the training corpus and the sampling value of the corresponding negative corpus.

In this implementation, the negative corpus is extracted based on the encoding value of the training corpus by using a mapping relationship. When the training corpus is not added, deleted, or modified, the encoding value of the training corpus remains unchanged, and the mapping relationship also remains unchanged. Therefore, the negative corpus extracted based on the encoding value of the training corpus by using the mapping relationship remains unchanged. Because the training corpus and the extracted negative corpus remain unchanged, a model obtained through training by using the training corpus and the negative corpus is highly stable. In this way, when the training corpus is not added, deleted, or modified, models obtained through two or more times of training can remain almost the same, and therefore test corpora of the developer have almost same confidence (difference <0.01) in the models obtained through the plurality of times of training, to reduce accuracy fluctuation and improve developer experience.

According to a second aspect, an embodiment provides an artificial intelligence-based semantic recognition apparatus, including:

an obtaining module, configured to obtain a query statement entered by a user;

a recognition module, configured to recognize the query statement by using a pre-trained semantic recognition model, to obtain an intent of the query statement, where the pre-trained semantic recognition model is trained by using a training corpus and a negative corpus, and the negative corpus is extracted by mapping an encoding value of the training corpus to a negative corpus set;

a query module, configured to obtain, based on the query statement obtained by the obtaining module and the intent of the query statement recognized by the recognition module, a response corresponding to the query statement; and a display module, configured to display the response corresponding to the query statement.

In a possible implementation, the obtaining module is configured to: obtain a query statement entered by the user by using a text; obtain a query statement entered by the user by using a voice; or obtain a picture entered by the user and recognize the picture to obtain a query statement included in the picture.

In a possible implementation, the apparatus further includes:

a grouping module, configured to group training corpora based on a quantity of negative corpora that need to be extracted;

an encoding module, configured to encode all groups of training corpora to obtain encoding values of all groups of training corpora;

an extraction module, configured to extract a first-type negative corpus and a second-type negative corpus based on the encoding values obtained by the encoding module; and a training module, configured to perform training by using the training corpora, the first-type negative corpus, and the second-type negative corpus to obtain the semantic recognition model.

In a possible implementation, the extraction module includes:

a quantity obtaining submodule, configured to obtain a first quantity of first-type negative corpora included in a first negative corpus set;

a sampling value obtaining submodule, configured to obtain a first sampling value of the first-type negative corpus based on the encoding values of all groups of training corpora and the first quantity; and a corpus extraction submodule, configured to extract a first-type first negative corpus from the first negative corpus set based on the first sampling value obtained by the sampling value obtaining submodule.

In a possible implementation, the extraction module further includes:

a similarity calculation submodule, configured to: after the corpus extraction submodule extracts the first-type first negative corpus, calculate a first similarity between the first negative corpus and the training corpus.

The corpus extraction submodule is further configured to: if the first similarity is less than a first similarity threshold, determine that the first negative corpus is successfully sampled, and add the first negative corpus to a sampling corpus set.

In a possible implementation, the sampling value obtaining submodule is further configured to: after the similarity calculation submodule calculates the first similarity, if the first similarity is greater than or equal to the first similarity threshold, obtain a second sampling value based on the first sampling value.

The corpus extraction submodule is further configured to extract a first-type second negative corpus from the first negative corpus set based on the second sampling value obtained by the sampling value obtaining submodule.

The similarity calculation submodule is further configured to calculate a second similarity between the second negative corpus and the training corpus.

The corpus extraction submodule is further configured to: if the second similarity is less than the first similarity threshold, determine that the second negative corpus is successfully sampled, and add the second negative corpus to the sampling corpus set.

In a possible implementation, the sampling value obtaining submodule is further configured to: after the similarity calculation submodule calculates the second similarity, if the second similarity is greater than or equal to the first similarity threshold, repeatedly perform a step of obtaining a second sampling value based on the first sampling value and subsequent steps.

The corpus extraction submodule is further configured to: when a quantity of repetition times is greater than a preset threshold of a quantity of repetition times, if a similarity between a negative corpus obtained through current sampling and the training corpus is less than a second similarity threshold, determine that the negative corpus obtained through the current sampling is successfully sampled, and add the negative corpus obtained through the current sampling to the sampling corpus set; or if a similarity between a negative corpus obtained through current sampling and the training corpus is greater than or equal to a second similarity threshold, add the negative corpus successfully sampled last time to the sampling corpus set again.

In a possible implementation, the extraction module includes:
  an encoding value obtaining submodule, configured to: sequentially obtain every M encoding values from the encoding values; and select a second quantity of encoding values from every M obtained encoding values;
  a corpus extraction submodule, configured to extract the second-type negative corpus from a second negative corpus set based on the second quantity of encoding values; and
  an encoding value sorting submodule, configured to sort the encoding values.

The encoding value obtaining submodule is further configured to: sequentially obtain every N encoding values from the sorted encoding values; and select a third quantity of encoding values from every N obtained encoding values.

The corpus extraction submodule is further configured to extract the second-type negative corpus from the second negative corpus set based on the third quantity of encoding values, where M and N are positive integers, and M N.

In a possible implementation, the extraction module includes:
  a sampling value obtaining submodule, configured to obtain a third sampling value of the first-type negative corpus and a fourth sampling value of the second-type negative corpus based on the encoding values of all groups of training corpora and a pre-learned mapping relationship; and
  a corpus extraction submodule, configured to: extract the first-type negative corpus from a first negative corpus set based on the third sampling value obtained by the sampling value obtaining submodule, and extract the second-type negative corpus from a second negative corpus set based on the fourth sampling value.

In a possible implementation, the extraction module further includes:
  a sample pair obtaining submodule, configured to obtain a training sample pair before the sampling value obtaining submodule obtains the third sampling value of the first-type negative corpus and the fourth sampling value of the second-type negative corpus, where the training sample pair includes an encoding value of a training corpus and a sampling value of a corresponding negative corpus, and a distance between sampling values of negative corpora corresponding to training corpora meets a preset constraint distance; and
  a mapping relationship learning submodule, configured to learn a mapping relationship by using the training sample pair, where the mapping relationship includes a mapping relationship between the encoding value of the training corpus and the sampling value of the corresponding negative corpus.

According to a third aspect, an embodiment provides an artificial intelligence-based semantic recognition device, including a display, one or more processors, a memory, a plurality of application programs, and one or more computer programs. The one or more computer programs are stored in the memory, the one or more computer programs include instructions, and when the instructions are executed by the device, the device is enabled to perform the following steps:
  obtaining a query statement entered by a user;
  recognizing the query statement by using a pre-trained semantic recognition model, to obtain an intent of the query statement, where the pre-trained semantic recognition model is trained by using a training corpus and a negative corpus, and the negative corpus is extracted by mapping an encoding value of the training corpus to a negative corpus set;
  obtaining, based on the query statement and the intent of the query statement, a response corresponding to the query statement; and
  displaying the response corresponding to the query statement.

In a possible implementation, when the instructions are executed by the device, the device is enabled to perform the following steps:
  obtaining a query statement entered by the user by using a text;
  obtaining a query statement entered by the user by using a voice; or
  obtaining a picture entered by the user and recognizing the picture to obtain a query statement included in the picture.

In a possible implementation, when the instructions are executed by the device, the device is enabled to perform the following steps:
  grouping training corpora based on a quantity of negative corpora that need to be extracted;
  coding all groups of training corpora to obtain encoding values of all groups of training corpora;

extracting a first-type negative corpus and a second-type negative corpus based on the encoding values; and performing training by using the training corpora, the first-type negative corpus, and the second-type negative corpus to obtain the semantic recognition model.

Solutions in the second aspect and the third aspect are consistent with solutions in the first aspect. Beneficial effects achieved by the various aspects and corresponding feasible implementations are similar. Details are not described again.

According to a fourth aspect, an embodiment provides a computer-readable storage medium. The computer-readable storage medium stores a computer program, and when the computer program is run on a computer, the computer is enabled to perform the method according to the first aspect.

According to a fifth aspect, an embodiment provides a computer program. When the computer program is executed by a computer, the computer program is used to perform the method according to the first aspect.

In a possible implementation, all or some of the programs in the fifth aspect may be stored in a storage medium encapsulated with the processor, or some or all of the programs may be stored in a memory that is not encapsulated with the processor.

DETAILED DESCRIPTION OF THE EMBODIMENTS

Terms used in the embodiments are merely used to explain the embodiments, but are not intended as limiting.

In the conventional technology, after a model is retrained by using a machine learning intent recognition algorithm used by a Bot platform used as a model training platform, a main reason for model differentiation is that there are two random factors. One random factor is randomly generating an adversarial negative corpus, and a manner of generating the negative corpus is randomly extractive, for example, randomly extracting a chit-chat corpus such as "Hello". The other random factor is automatically generating an adversarial negative corpus, and a manner of generating the negative corpus is generative, for example, generating a negative corpus such as "bank card" based on "card". The foregoing two manners of randomly generating the negative corpus make the model instable.

Therefore, a de-randomized stability sampling method may permit the foregoing two manners of generating the negative corpus to become stable, and randomly extract the negative corpus, so that a training model remains stable. When a configuration of a developer is not modified, models obtained through two times of training on the Bot platform are the same, so that a same corpus has a same prediction effect in models obtained through a plurality of times of training.

It should be noted that the Bot platform is merely an example of the model training platform, and the model training platform may alternatively be another platform. This is not limited.

Figure 1:
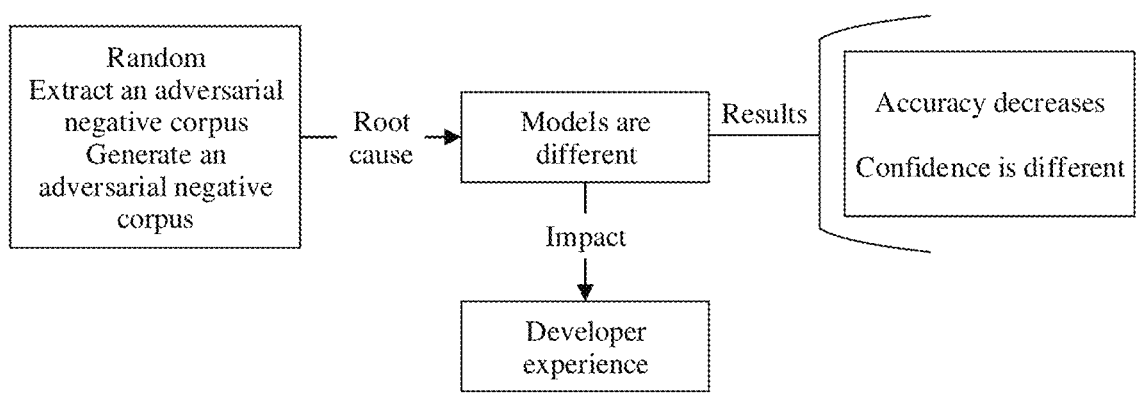
FIG. 1 is a schematic diagram of a problem in a model generated on a Bot platform in the conventional technology.

FIG. 1 is a schematic diagram of a problem in a model generated on a Bot platform in the conventional technology. As shown in FIG. 1, in the conventional technology, a randomized method for generating a negative corpus is instable. Consequently, a model obtained through retraining on the Bot platform is greatly different from a model obtained through previous training. Details are as follows:

(1) Accuracy fluctuation: After retraining, confidence of a classification algorithm fluctuates, and consequently prediction accuracy is decreased. For a carefully tuned corpus, an indicator such as accuracy is seriously affected, and therefore does not meet an expectation.

(2) Inconsistent experience: Model instability caused by retraining a model leads to confidence fluctuation. A same corpus has different results in different models obtained through training. This affects experience.

Figure 2:
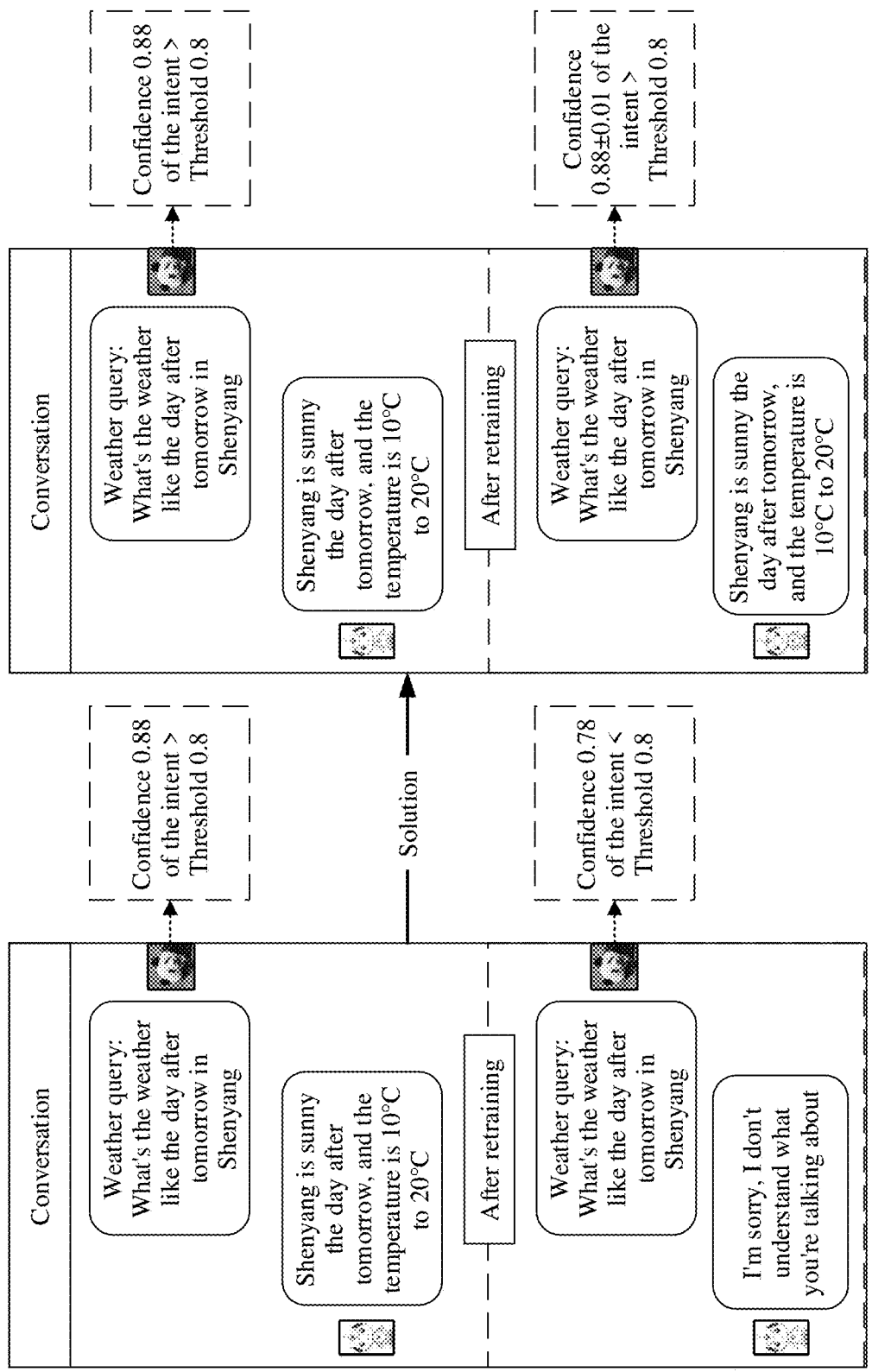
FIG. 2 is a schematic diagram of confidence of a model obtained through training by using a method.

For the problem in the Bot platform, a problem to be resolved is to change the randomized method for generating a negative corpus into a stable generation method. In this way, when a training corpus is not added, deleted, or modified, models obtained through two or more times of training can remain almost the same, and therefore test corpora of a developer have almost same confidence (difference <0.01) in the models obtained through the plurality of times of training, as shown in FIG. 2, to reduce accuracy fluctuation and improve developer experience. FIG. 2 is a schematic diagram of confidence of a model obtained through training.

It can be learned from FIG. 2 that, in the conventional technology, for a query statement "What's the weather like the day after tomorrow in Shenyang", the query statement is recognized by using models obtained through two times of training to learn that an intent of the query statement is "Weather query". However, it can be learned from FIG. 2 that, in the conventional technology, confidence of an intent recognized by a model obtained through previous training is 0.88, and confidence of an intent recognized by a model obtained through retraining is 0.78. A difference between the confidence of the intents recognized by the models obtained through the two times of training is large (0.1). Consequently, the models obtained through the two times of training provide different answers for the same query statement, and therefore developer experience is affected.

After a negative corpus is generated, it can be learned that the difference between the confidence of the intents recognized by the models obtained through the two times of training is very small (0.01). In this way, the models obtained through the two times of training provide a same answer for the same query statement, and therefore developer experience can be improved.

The following describes a training process of a semantic recognition model. The semantic recognition model may be obtained through training on a model training platform such as a Bot platform. The model training platform may be deployed on a cloud server. Additionally, the semantic recognition model may alternatively be obtained through training on another device. An execution body for training the semantic recognition model is not limited in this embodiment.

Figure 3:
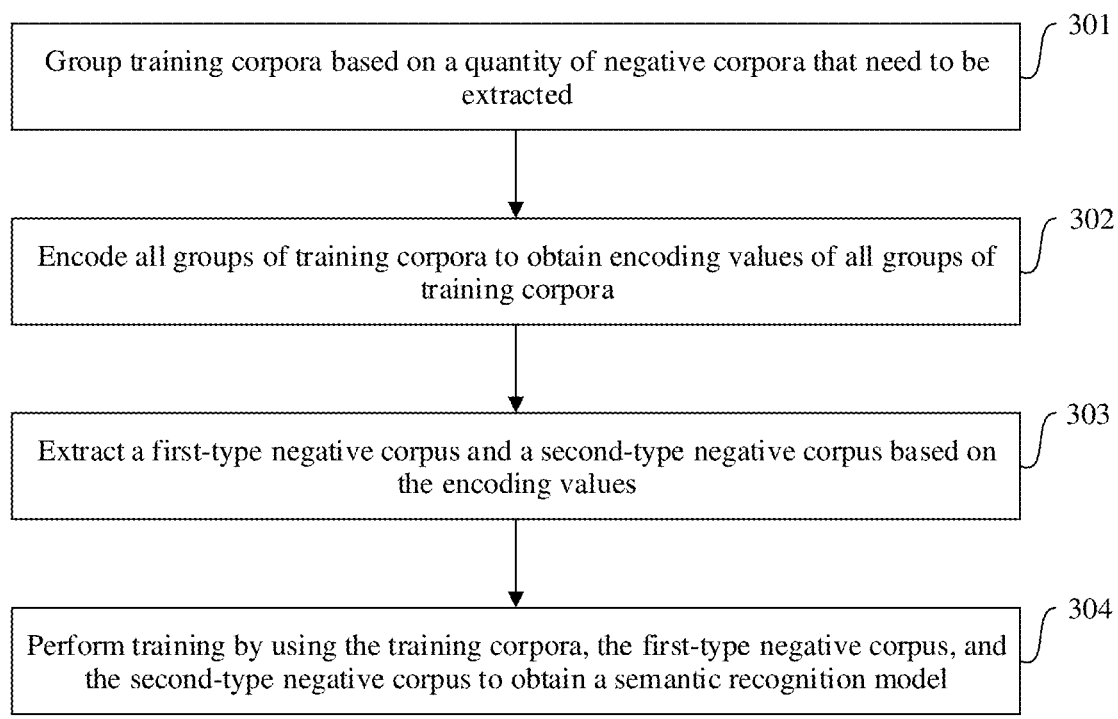
FIG. 3 is a flowchart of an embodiment of a training process of a semantic recognition model in an artificial intelligence-based semantic recognition method.

FIG. 3 is a flowchart of an embodiment of a training process of a semantic recognition model in an artificial intelligence-based semantic recognition method. As shown in FIG. 3, the method may include the following steps.

Step 301: Group training corpora based on a quantity of negative corpora that need to be extracted.

The quantity of negative corpora that need to be extracted may be independently set based on an implementation requirement and/or system performance in an implementation. This is not limited in this embodiment. Assuming that the quantity of negative corpora that need to be extracted is Num, the training corpora need to be grouped into Num groups, where Num is a positive integer.

Further, the training corpora may be further sorted before the training corpora are grouped based on the quantity of negative corpora that need to be extracted. The training corpora may be sorted in the following sorting manner sorting the training corpora based on a character string, a hash value of the training corpora, a simhash value of the training corpora, or the like. Also, the training corpora may alternatively be sorted in another sorting manner. This is not limited in this embodiment. In this embodiment, the training corpora are sorted, so that when the training corpora are completely the same, the encoding value obtained after the grouping does not change with a corpus order, to ensure that the grouping of the training corpora does not change.

Step 302: encode all groups of training corpora to obtain encoding values of all groups of training corpora.

In this embodiment, after each group of training corpora is obtained through grouping, each group of training corpora may be encoded, so that each group of training corpora has a unique encoding value. An encoding manner may include a manner based on a hash value, a simhash value, or the like. Further, another encoding manner may alternatively be used. This is not limited in this embodiment. In an implementation, in this embodiment, each group of training corpora may be divided into words in an N-gram manner, for example, a unigram manner and a bigram manner, then the words are encoded, and a calculated simhash value is used as an encoding value of each group of training corpora.

Step 303: Extract a first-type negative corpus and a second-type negative corpus based on the encoding values.

The first-type negative corpus may be a chit-chat negative corpus, and the second-type negative corpus may be a high-frequency positive vocabulary negative corpus.

For example, the chit-chat negative corpus may include a chit-chat corpus such as "Hello", and the high-frequency positive vocabulary negative corpus may include a negative corpus such as "bank card" generated based on a high-frequency positive vocabulary "card", where the high-frequency positive vocabulary includes a vocabulary that appears frequently in the training corpus.

Step 304: Perform training by using the training corpora, the first-type negative corpus, and the second-type negative corpus to obtain the semantic recognition model.

In this embodiment, after the training corpora are grouped, all groups of training corpora are encoded, the first-type negative corpus and the second-type negative corpus are extracted based on the encoding values, and then training is performed by using the training corpora, the first-type negative corpus, and the second-type negative corpus to obtain the semantic recognition model. Therefore, the negative corpus is uniquely extracted based on the encoding value of the training corpus, and a randomized method for generating the negative corpus is changed into a stable generation method. In this way, when the training corpus is not added, deleted, or modified, models obtained through two or more times of training can remain almost the same, and therefore test corpora of a developer have almost same confidence (difference <0.01) in the models obtained through the plurality of times of training, to reduce accuracy fluctuation and improve developer experience.

Figure 4A:
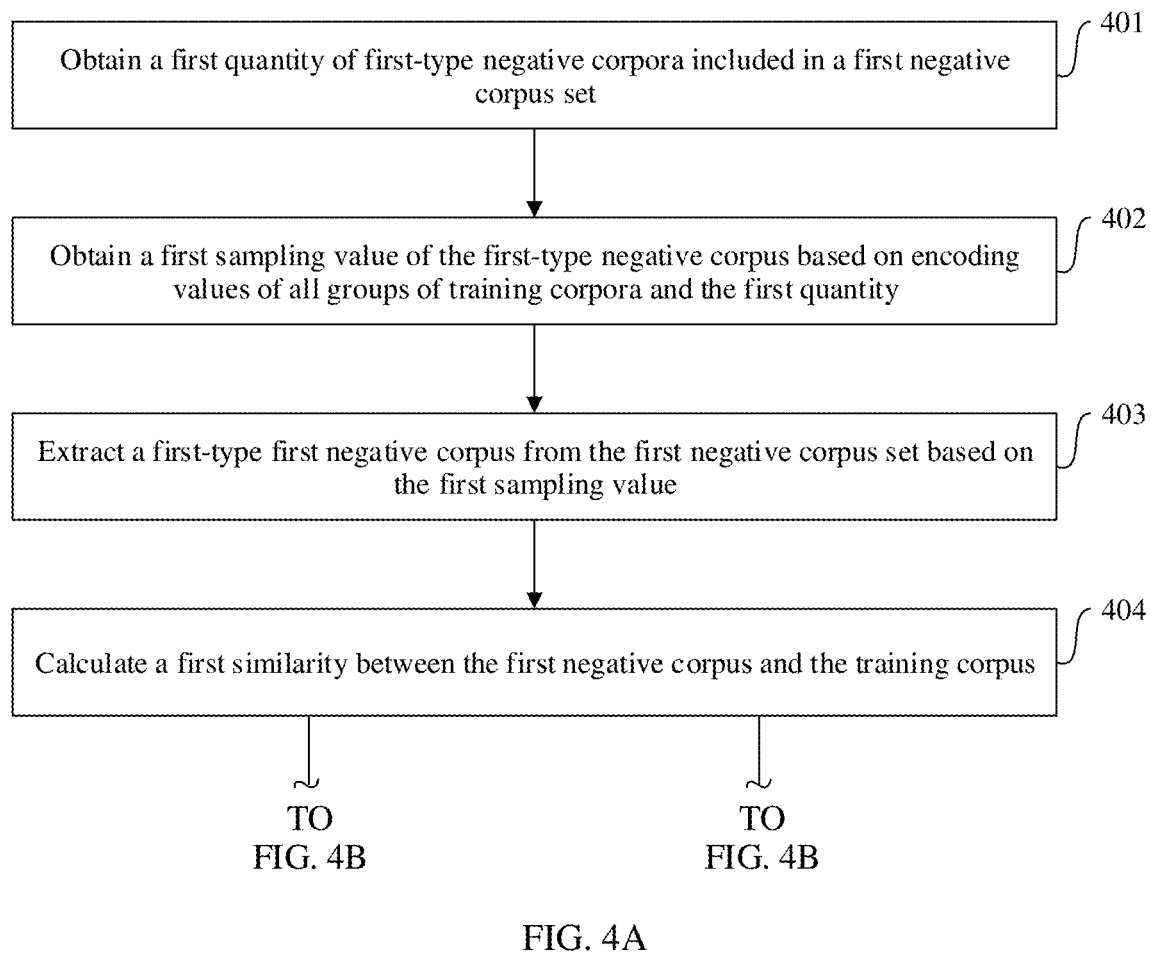
FIG. 4A and FIG. 4B are a flowchart of another embodiment of a training process of a semantic recognition model in an artificial intelligence-based semantic recognition method.
Figure 4B:
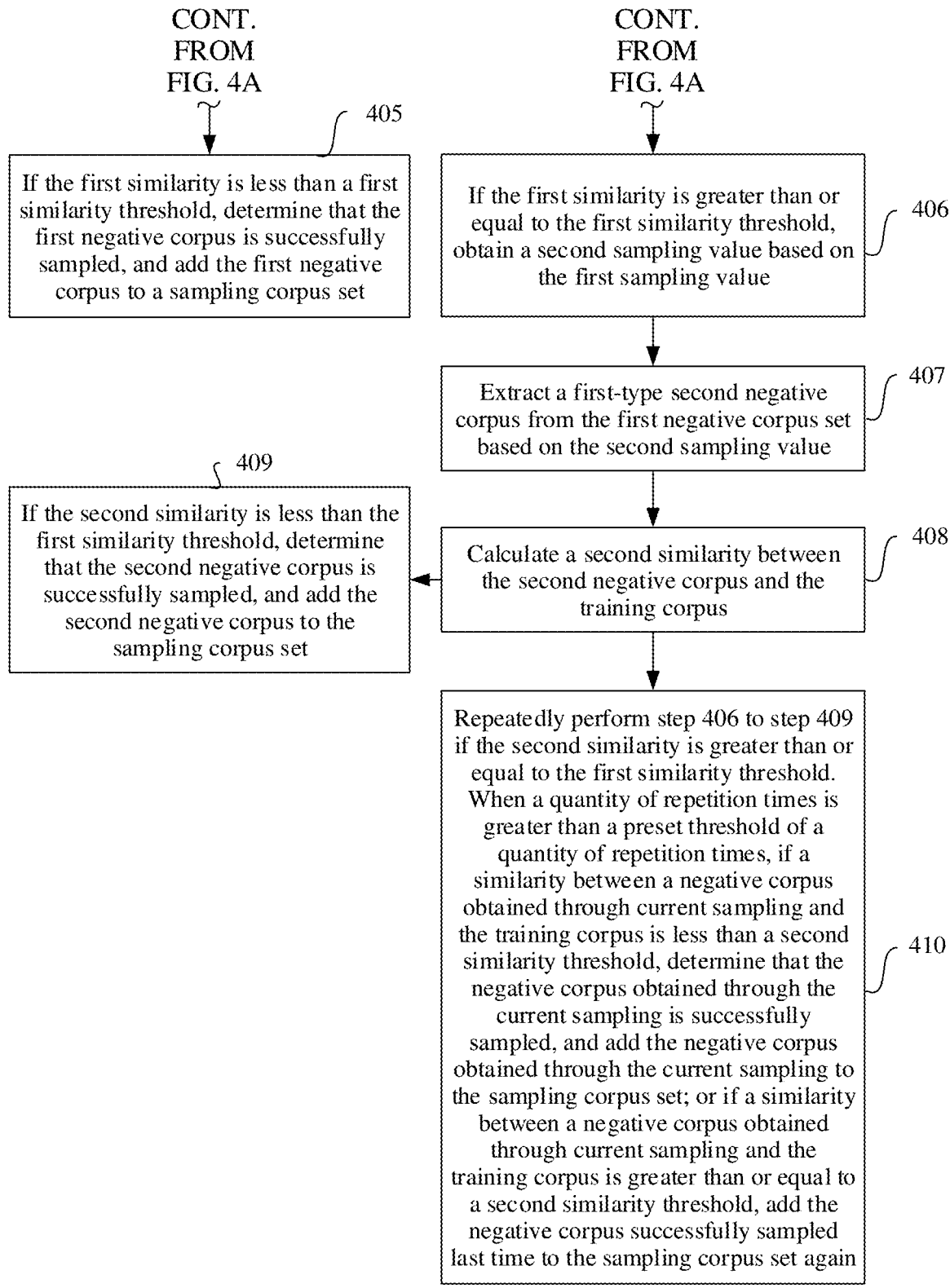

FIG. 4A and FIG. 4B are a flowchart of another embodiment of a training process of a semantic recognition model in an artificial intelligence-based semantic recognition method. As shown in FIG. 4A and FIG. 4B, in the embodiment shown in FIG. 3, step 303 in which the first-type negative corpus is extracted based on the encoding values may include the following steps.

Step 401: Obtain a first quantity of first-type negative corpora included in a first negative corpus set.

The first negative corpus set may be a chit-chat negative corpus set, and the first quantity is a total quantity of first-type negative corpora included in the first negative corpus set.

Step 402: Obtain a first sampling value of the first-type negative corpus based on the encoding values of all groups of training corpora and the first quantity.

A first sampling value of the first-type negative corpus may be obtained based on the encoding values of all groups of training corpora and the first quantity in the following manner obtaining a remainder by performing a modulo operation of division by the first quantity by using the encoding values of all groups of training corpora, using the modulo operation as a mapping relationship, and using the remainder as the first sampling value. The foregoing descriptions are merely an implementation of obtaining the first sampling value of the first-type negative corpus based on the encoding values of all groups of training corpora and the first quantity. The first sampling value of the first-type negative corpus may alternatively be obtained based on the encoding values of all groups of training corpora and the first quantity in another implementation. This is not limited in this embodiment.

Step 403: Extract a first-type first negative corpus from the first negative corpus set based on the first sampling value.

The first negative corpus set may be searched based on the first sampling value, and the first negative corpus whose identifier (or index) matches the first sampling value is extracted.

Further, after step 403, the method may further include the following steps.

Step 404: Calculate a first similarity between the first negative corpus and the training corpus, and then perform step 405 or step 406.

After the first negative corpus is extracted based on the first sampling value, the first similarity between the first negative corpus and the training corpus needs to be calculated. The training corpora herein include all positive corpora, that is, all positive training corpora configured on a model training platform.

In an implementation, the first similarity between the first negative corpus and the training corpus may be calculated by using a Lucene algorithm.

Step 405: If the first similarity is less than a first similarity threshold, determine that the first negative corpus is successfully sampled, and add the first negative corpus to a sampling corpus set. This procedure ends.

The first similarity threshold may be independently set based on system performance and/or an implementation requirement in an implementation. The first similarity threshold is not limited in this embodiment.

Step 406: If the first similarity is greater than or equal to the first similarity threshold, obtain a second sampling value based on the first sampling value.

In an implementation, the second sampling value may be obtained by adding a preset value to the first sampling value.

The preset value may be independently set based on system performance and/or an implementation requirement in an implementation. The preset value is not limited in this embodiment.

Step 407: Extract a first-type second negative corpus from the first negative corpus set based on the second sampling value.

Similarly, the first negative corpus set may be searched based on the second sampling value, and the second negative corpus whose identifier (or index) matches the second sampling value is extracted.

Step 408: Calculate a second similarity between the second negative corpus and the training corpus, and then perform step 409 or step 410.

After the second negative corpus is extracted based on the second sampling value, the first similarity between the second negative corpus and the training corpus needs to be calculated. The training corpora herein include all positive corpora, that is, all positive training corpora configured on the model training platform.

Step 409: If the second similarity is less than the first similarity threshold, determine that the second negative corpus is successfully sampled, and add the second negative corpus to the sampling corpus set. This procedure ends.

Step 410: Repeatedly perform step 406 to step 409 if the second similarity is greater than or equal to the first similarity threshold. When a quantity of repetition times is greater than a preset threshold of a quantity of repetition times, if a similarity between a negative corpus obtained through current sampling and the training corpus is less than a second similarity threshold, determine that the negative corpus obtained through the current sampling is successfully sampled, and add the negative corpus obtained through the current sampling to the sampling corpus set; or if a similarity between a negative corpus obtained through current sampling and the training corpus is greater than or equal to a second similarity threshold, add the negative corpus successfully sampled last time to the sampling corpus set again.

The preset threshold of a quantity of repetition times may be independently set based on system performance and/or an implementation requirement in an implementation. The preset quantity of repetition times is not limited in this embodiment. For example, the preset quantity of repetition times may be 5.

The second similarity threshold may be independently set based on system performance and/or an implementation requirement in an implementation. The second similarity threshold is not limited in this embodiment, provided that the second similarity threshold is greater than the first similarity threshold.

If a training corpus configured by a developer is similar to a corpus in the first negative corpus set, using the corpus as the negative corpus affects recognition of an intent of the training corpus and confidence in recognizing the intent of the training corpus as a negative intent or a positive intent is low. In this embodiment, a sampling corpus highly similar to the training corpus is eliminated, to avoid impact on the positive intent. In this embodiment, a negative corpus lowly similar to the training corpus may be added to the sampling corpus set, but a negative corpus highly similar to the training corpus is not added to the sampling corpus set.

Figure 5:
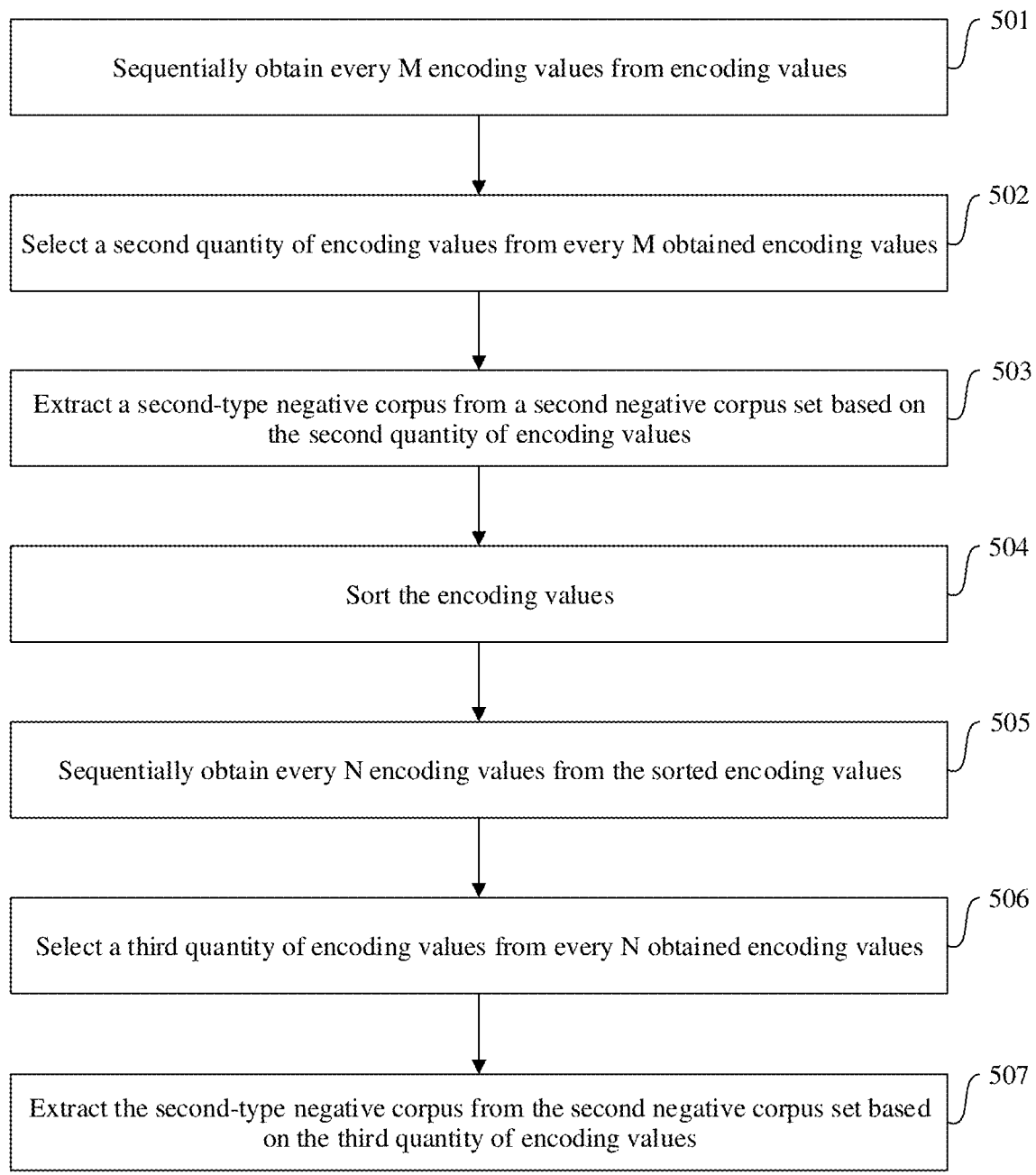
FIG. 5 is a flowchart of still another embodiment of a training process of a semantic recognition model in an artificial intelligence-based semantic recognition method.

FIG. 5 is a flowchart of still another embodiment of a training process of a semantic recognition model in an artificial intelligence-based semantic recognition method. As shown in FIG. 5, in the embodiment shown in FIG. 3, step 303 in which the second-type negative corpus is extracted based on the encoding values may include the following steps.

Step 501: Sequentially obtain every M encoding values from the encoding values.

Step 502: Select a second quantity of encoding values from every M obtained encoding values.

The second quantity may be independently set in an implementation. The second quantity is not limited in this embodiment.

Step 503: Extract a second-type negative corpus from a second negative corpus set based on the second quantity of encoding values.

The second negative corpus set may be a high-frequency positive vocabulary negative corpus set, and the second-type negative corpus included in the second negative corpus set may be a high-frequency word.

Step 504: Sort the encoding values.

Step 505: Sequentially obtain every N encoding values from the sorted encoding values.

Step 506: Select a third quantity of encoding values from every N obtained encoding values.

The third quantity may be independently set in an implementation. The third quantity is not limited in this embodiment.

Step 507: Extract the second-type negative corpus from the second negative corpus set based on the third quantity of encoding values.

Herein, M and N are positive integers, and M N. M and N may be independently set based on system performance and/or an implementation requirement in an implementation. M and N are not limited in this embodiment. For example, M may be 2, and N may be 3.

Assuming that training corpora are grouped into four groups, and encoding values of the four groups of training corpora are respectively a1, a2, a3, and a4, every two encoding values, that is, a1a2, a2a3, and a3a4, may be sequentially obtained from the encoding values, and then a second quantity of encoding values may be selected from every two obtained encoding values (a1a2, a2a3, and a3a4). Herein, assuming that the second quantity is 2, two groups of encoding values a1a2 and a2a3 may be selected, or two groups of encoding values a1a2 and a3a4 may be selected. This is not limited in this embodiment. Descriptions are provided herein by using an example in which the two groups of encoding values a1a2 and a2a3 are selected. It should be noted that, if the second quantity is 2, the two groups of encoding values a1a2 and a2a3 are selected during the first selection, and therefore the two groups of encoding values a1a2 and a2a3 still need to be selected each time model training is performed subsequently.

Next, the group of encoding values a1a2 is used as an example. The encoding values a1 and a2 are first mapped to a second negative corpus set. A simplest mapping method herein is that a remainder is obtained by performing a modulo operation of division by a total quantity of negative corpora included in the second negative corpus set by using the encoding values. Second negative corpora extracted based on the encoding values a1 and a2 are combined to generate a bigram negative corpus, and the generated bigram negative corpus is used as a second-type negative corpus. Then, the generated bigram negative corpus is added to the negative corpus set required for the training corpus. Similarly, a same method may be used to generate a second-type negative corpus corresponding to a2a3.

Then, a1, a2, a3, and a4 are re-sorted. Assuming that re-sorted encoding values are a2, a1, a3, and a4, every three encoding values, that is, a2a1a3 and a1a3a4, are sequentially obtained from the sorted encoding values, and then a third quantity of encoding values may be obtained from every three obtained encoding values (that is, a2a1a3 and a1a3a4). Herein, assuming that the third quantity is 1, a group of encoding values a2a1a3 may be selected, or a group of encoding values a1a3a4 may be selected. This is not limited in this embodiment. Descriptions are provided herein by using an example in which the group of encoding values a2a1a3 is selected. It should be noted that, if the third quantity is 1, the group of encoding values a2a1a3 is selected during the first selection, and therefore the group of encoding values a2a1a3 still needs to be selected each time model training is performed subsequently.

Next, the encoding values a2, a1, and a3 may be mapped to a second negative corpus set. A simplest mapping method herein is that a remainder is obtained by performing a modulo operation of division by a total quantity of negative corpora included in the second negative corpus set by using the encoding values. Second negative corpora extracted based on the encoding values a2, a1, and a3 are combined to generate a trigram negative corpus, and the generated trigram negative corpus is used as a second-type negative corpus. Then, the generated trigram negative corpus is added to the negative corpus set required for the training corpus. Herein, a1, a2, a3, and a4 are re-sorted, so that the generated trigram negative corpus does not include the generated bigram negative corpus.

In this embodiment, the second negative corpus is extracted based on the encoding value of the training corpus by using a mapping relationship. When the training corpus is not added, deleted, or modified, the encoding value of the training corpus remains unchanged, and the mapping relationship also remains unchanged. Therefore, the second negative corpus extracted based on the encoding value of the training corpus by using the mapping relationship remains unchanged. Because the training corpus and the extracted negative corpus remain unchanged, a model obtained through training by using the training corpus and the negative corpus is highly stable. In this way, when the training corpus is not added, deleted, or modified, models obtained through two or more times of training can remain almost the same, and therefore test corpora of a developer have almost same confidence (difference <0.01) in the models obtained through the plurality of times of training, to reduce accuracy fluctuation and improve developer experience.

In this embodiment, a total quantity of negative corpora included in the first negative corpus set and a total quantity of negative corpora included in the second negative corpus set are not limited. Herein, only a mapping method is proposed based on the encoding value. Mapping to the first negative corpus set and the second negative corpus set to ensure a same method for each time of sampling.

Figure 6:
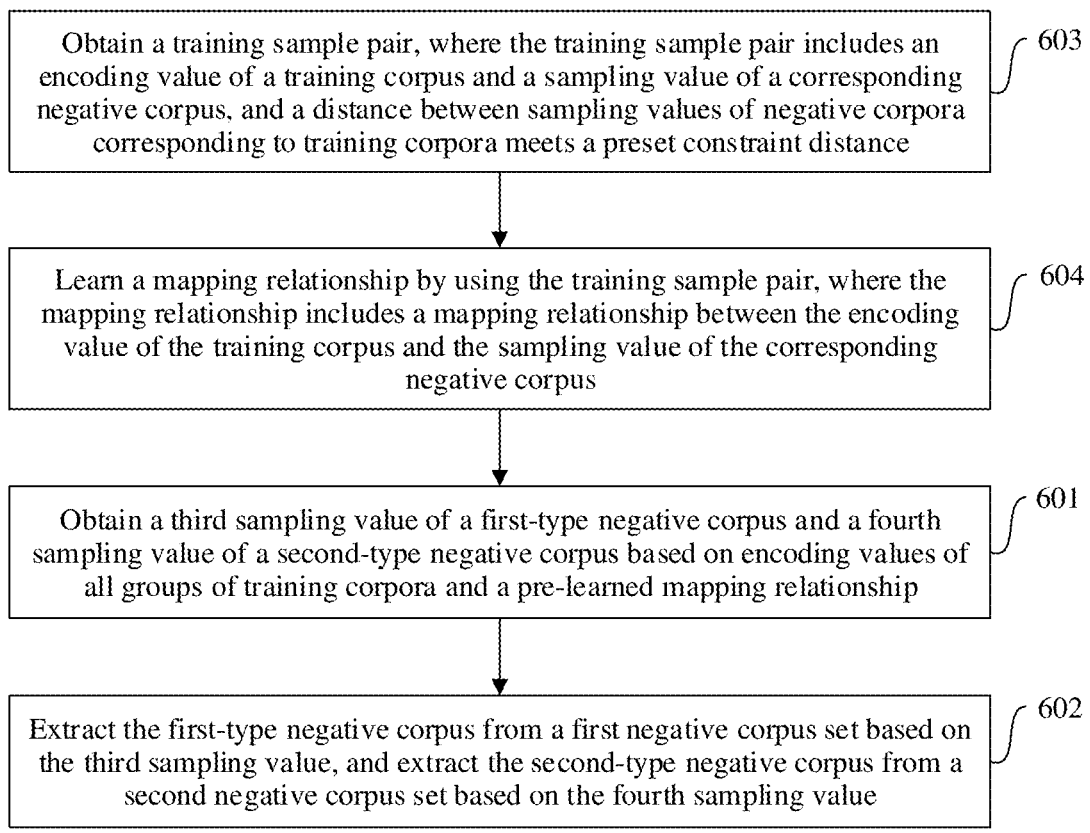
FIG. 6 is a flowchart of yet another embodiment of a training process of a semantic recognition model in an artificial intelligence-based semantic recognition method.

FIG. 6 is a flowchart of yet another embodiment of a training process of a semantic recognition model in an artificial intelligence-based semantic recognition method. As shown in FIG. 6, in the embodiment shown in FIG. 3, step 303 in which the first-type negative corpus and the second-type negative corpus are extracted based on the encoding values may include the following steps.

Step 601: Obtain a third sampling value of the first-type negative corpus and a fourth sampling value of the second-type negative corpus based on the encoding values of all groups of training corpora and a pre-learned mapping relationship.

The pre-learned mapping relationship may include a modulo operation. This is not limited in this embodiment.

Step 602: Extract the first-type negative corpus from the first negative corpus set based on the third sampling value and extract the second-type negative corpus from the second negative corpus set based on the fourth sampling value.

After step 601, the method may further include the following steps.

Step 603: Obtain a training sample pair, where the training sample pair includes an encoding value of a training corpus and a sampling value of a corresponding negative corpus, and a distance between sampling values of negative corpora corresponding to training corpora meets a preset constraint distance.

The training sample pair may be obtained in the following manner.

Based on an isometry mapping constraint, for example, a method such as multi-dimensional scaling (MDS for short), a problem of measuring different probability distributions in space is transformed into a problem of measuring isometry constraints of relative locations of training samples in different space, to ensure that two probability distributions in the space are consistent in terms of distance. Modeling may be performed based on the isometry constraint to solve paired training samples. A method may be a kernel-based learning method. A training sample pair is constructed by directly defining a relative mapping relationship for a nearest neighbor sample without requiring explicit mapping.

Step 604: Learn a mapping relationship by using the training sample pair, where the mapping relationship includes a mapping relationship between the encoding value of the training corpus and the sampling value of the corresponding negative corpus.

In this embodiment, according to the encoding value-based sampling method provided in this embodiment, the first-type negative corpus is extracted from the first negative corpus set, to obtain a sampling corpus set. A KL divergence (Kullback-Leibler divergence) between a distribution of {ki} and a distribution of {k'i} can be minimized, so that the distribution of k sampling corpora {k'i} in the sampling corpus set is the same as the distribution of k sampling corpora {Id} randomly extracted from the first negative corpus set. The KL divergence may be calculated by using a formula shown in Equation (1).

$$D_{KL}(P\|Q) = \sum_{i} P(i) \ln \frac{Q(i)}{P(i)} \quad (1)$$

In Equation (1), P(i) is the distribution of {ki}, Q(i) is the distribution of {k'i}, and $D_{KL}$ (P∥Q) is the KL divergence between the distribution of {ki} and the distribution of {k'i}.

Assuming that a hash method is selected, a general formalization problem of the foregoing problem can be reduced to an x'i calculation method for minimizing the KL divergence between the distribution of {k'i=hash(x'i)} and the distribution of {ki}.

Solution analysis is provided below.

According to the hash method, simhash is selected. A simplest method for embedding the simhash into the first negative corpus set is to obtain a remainder (as described in the embodiment shown in FIG. 4A and FIG. 4B). Training corpora are first grouped, and then a simhash value of each group of training corpora is calculated and is used as an encoding value. An overlapping degree of hash(x'i) can be intuitively minimized to the maximum extent, and the simhash ensures a similarity constraint (64-bit simhash is usually used based on a Hamming distance. If the Hamming distance is less than 3, it may be considered that sentences are not similar).

Considering that an original training corpus set has a label (label), and a mapped negative corpus set has no label, the following two cases may occur: (1) Elements in the mapped set are of different classes. (2) Elements in the mapped set are of a same class. The class herein is an intrinsic structural category of the negative corpus. For example, the negative corpus has a category label or has no category label. The intrinsic structural category is determined through clustering or the like.

The foregoing two cases can be reduced to a fact that directly obtaining a remainder from a perspective of a more general distribution is not necessarily a best mapping relationship, because an original distribution cannot be directly approximated and is insensitive to content.

Therefore, in this embodiment, based on a distance constraint projected onto the first negative corpus set, an encoding value x of a training corpus existing before mapping is inversely solved, where x is a final sampling value that is of the negative corpus and that is obtained through a "virtual sample" Mapping(x) mapped by using a to-be-designed hash function. A simplest mapping relationship is a modulo operation, and a simplest hash is a hashcode of a JDK string. An inversion sampling operation is performed based on a classical cumulative distribution function (CDF).

(1) A hash is constrained by using a distance: Overlapping is controlled in advance by using the simhash and an original prior information distance is embedded to maintain a mapping relationship.

(2) An inverse problem is solved: A target distance constraint is embedded and a mapping relationship is learned.

In this embodiment, the negative corpus is extracted based on the encoding value of the training corpus by using the mapping relationship. When the training corpus is not added, deleted, or modified, the encoding value of the training corpus remains unchanged, and the mapping relationship also remains unchanged. Therefore, the negative corpus extracted based on the encoding value of the training corpus by using the mapping relationship remains unchanged. Because the training corpus and the extracted negative corpus remain unchanged, a model obtained through training by using the training corpus and the negative corpus is highly stable. In this way, when the training corpus is not added, deleted, or modified, models obtained through two or more times of training can remain almost the same, and therefore test corpora of a developer have almost same confidence (difference <0.01) in the models obtained through the plurality of times of training, to reduce accuracy fluctuation and improve developer experience.

A method for mapping a remainder obtained by performing a modulo operation on an encoding value to a negative corpus set in the embodiments shown in FIG. 3 to FIG. 5 and a randomized method for extracting a negative corpus by learning a mapping relationship, that is, a stable extraction method in the embodiment shown in FIG. 6 are not only applicable to negative corpus extraction, but also to a case in which other random factors need to be consistent each time.

According to the methods provided in the embodiments shown in FIG. 3 to FIG. 6, a trained semantic recognition model can be obtained, and then semantic recognition can be performed on the entered query statement by using the trained semantic recognition model. The semantic recognition model may be installed on a model training platform such as a Bot platform for semantic recognition. As shown in FIG. 2, a right block in FIG. 2 shows that according to the methods provided in the embodiments shown in FIG. 3 to FIG. 6, after the trained semantic recognition model is obtained, a query statement "What's the weather like the day after tomorrow in Shenyang" entered by the user is queried on the Bot platform by using the trained semantic recognition model, to learn that an intent of the query statement is "Weather query", so as to learn that an answer to the query statement is "Shenyang is sunny the day after tomorrow, . . . ", and display an example of the foregoing answer.

Alternatively, the semantic recognition model may be installed on another electronic device such as a server or a terminal for semantic recognition. The electronic device may include a device such as a cloud server, a mobile terminal (a mobile phone), a smart screen, an unmanned aerial vehicle, an intelligent connected vehicle (ICV), a smart/intelligent car, or a vehicle-mounted device.

Figure 7:
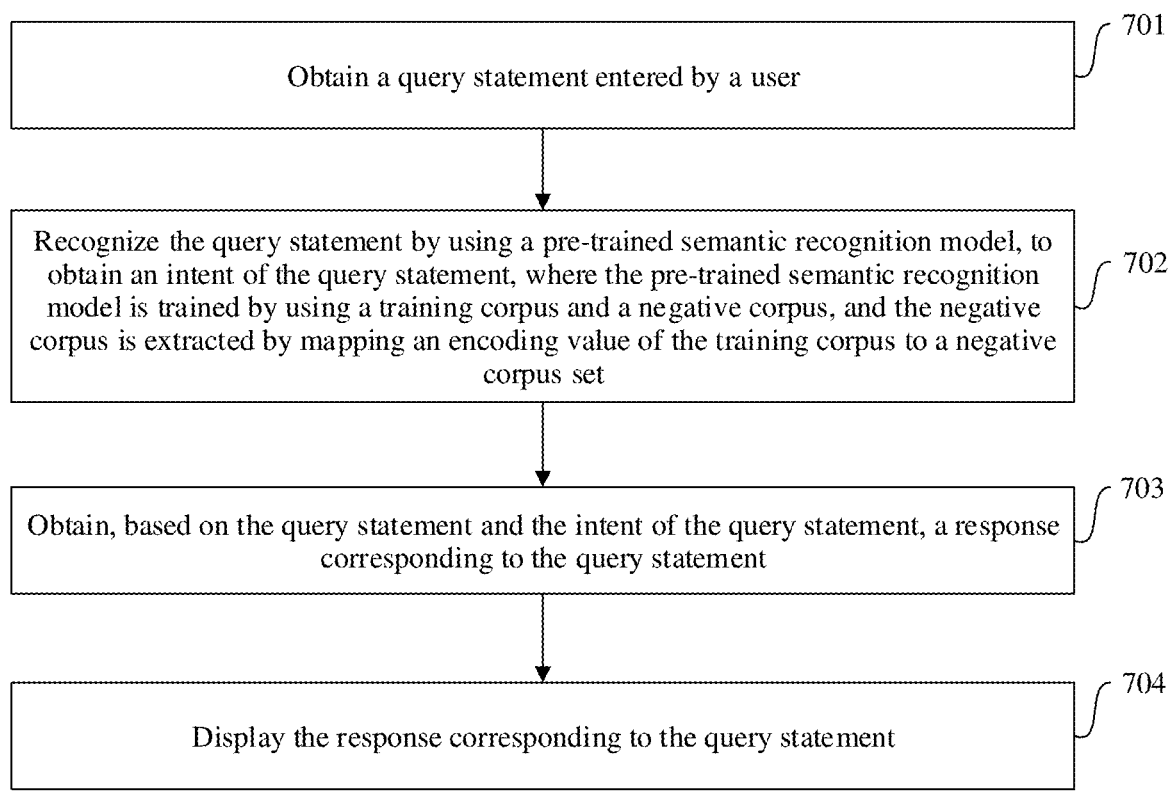
FIG. 7 is a flowchart of an embodiment of an artificial intelligence-based semantic recognition method.

FIG. 7 is a flowchart of an embodiment of an artificial intelligence-based semantic recognition method. As shown in FIG. 7, the artificial intelligence-based semantic recognition method may include the following steps.

Step 701: Obtain a query statement entered by a user.

A query statement entered by a user is obtained may include:
obtaining a query statement entered by the user by using a text;
obtaining a query statement entered by the user by using a voice; or
obtaining a picture entered by the user and recognizing the picture to obtain a query statement included in the picture.

In other words, the user may enter the query statement by using the text, the voice, or the picture.

Step 702: Recognize the query statement by using a pre-trained semantic recognition model, to obtain an intent of the query statement, where the pre-trained semantic recognition model is trained by using a training corpus and a negative corpus, and the negative corpus is extracted by mapping an encoding value of the training corpus to a negative corpus set.

The pre-trained semantic recognition model is trained according to the methods provided in the embodiments shown in FIG. 3 to FIG. 6. Details are not described herein again.

Step 703: Obtain, based on the query statement and the intent of the query statement, a response corresponding to the query statement.

Step 704: Display the response corresponding to the query statement.

According to the artificial intelligence-based semantic recognition method, the negative corpus is extracted based on the encoding value of the training corpus by using a mapping relationship. When the training corpus is not added, deleted, or modified, the encoding value of the training corpus remains unchanged, and the mapping relationship also remains unchanged. Therefore, the negative corpus extracted based on the encoding value of the training corpus by using the mapping relationship remains unchanged. Because the training corpus and the extracted negative corpus remain unchanged, a model obtained through training by using the training corpus and the negative corpus is highly stable. In this way, when the training corpus is not added, deleted, or modified, models obtained through two or more times of training can remain almost the same, and therefore test corpora of a developer have almost same confidence (difference <0.01) in the models obtained through the plurality of times of training, to reduce accuracy fluctuation and improve developer experience.

Figure 8:
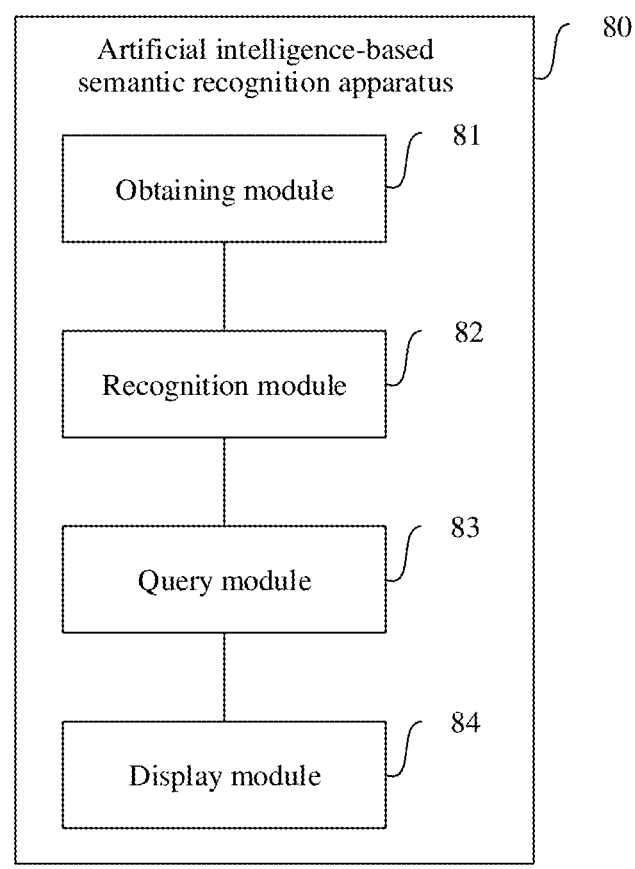
FIG. 8 is a schematic structural diagram of an embodiment of an artificial intelligence-based semantic recognition apparatus.

FIG. 8 is a schematic structural diagram of an embodiment of an artificial intelligence-based semantic recognition apparatus. As shown in FIG. 8, the artificial intelligence-based semantic recognition apparatus 80 may include an obtaining module 81, a recognition module 82, a query module 83, and a display module 84. It should be understood that the artificial intelligence-based semantic recognition apparatus 80 may correspond to a device 900 in FIG. 10. Functions of the obtaining module 81, the recognition module 82, and the query module 83 may be implemented by using a processor 910 in the device 900 in FIG. 10. The display module 84 may correspond to a display unit 970 in the device 900 in FIG. 10.

The obtaining module 81 is configured to obtain a query statement entered by a user. In this embodiment, the obtaining module 81 is configured to: obtain a query statement entered by the user by using a text; obtain a query statement entered by the user by using a voice; or obtain a picture entered by the user and recognize the picture to obtain a query statement included in the picture.

In other words, the user may enter the query statement by using the text, the voice, or the picture.

The recognition module 82 is configured to recognize the query statement by using a pre-trained semantic recognition model, to obtain an intent of the query statement, where the pre-trained semantic recognition model is trained by using a training corpus and a negative corpus, and the negative corpus is extracted by mapping an encoding value of the training corpus to a negative corpus set.

The query module 83 is configured to obtain, based on the query statement obtained by the obtaining module 81 and the intent of the query statement recognized by the recognition module 82, a response corresponding to the query statement.

The display module 84 is configured to display the response corresponding to the query statement.

The artificial intelligence-based semantic recognition apparatus provided in the embodiment shown in FIG. 8 may be configured to perform the solution in the method embodiment shown in FIG. 7. For an implementation principle of the artificial intelligence-based semantic recognition apparatus, further refer to the related descriptions in the method embodiment.

Figure 9:
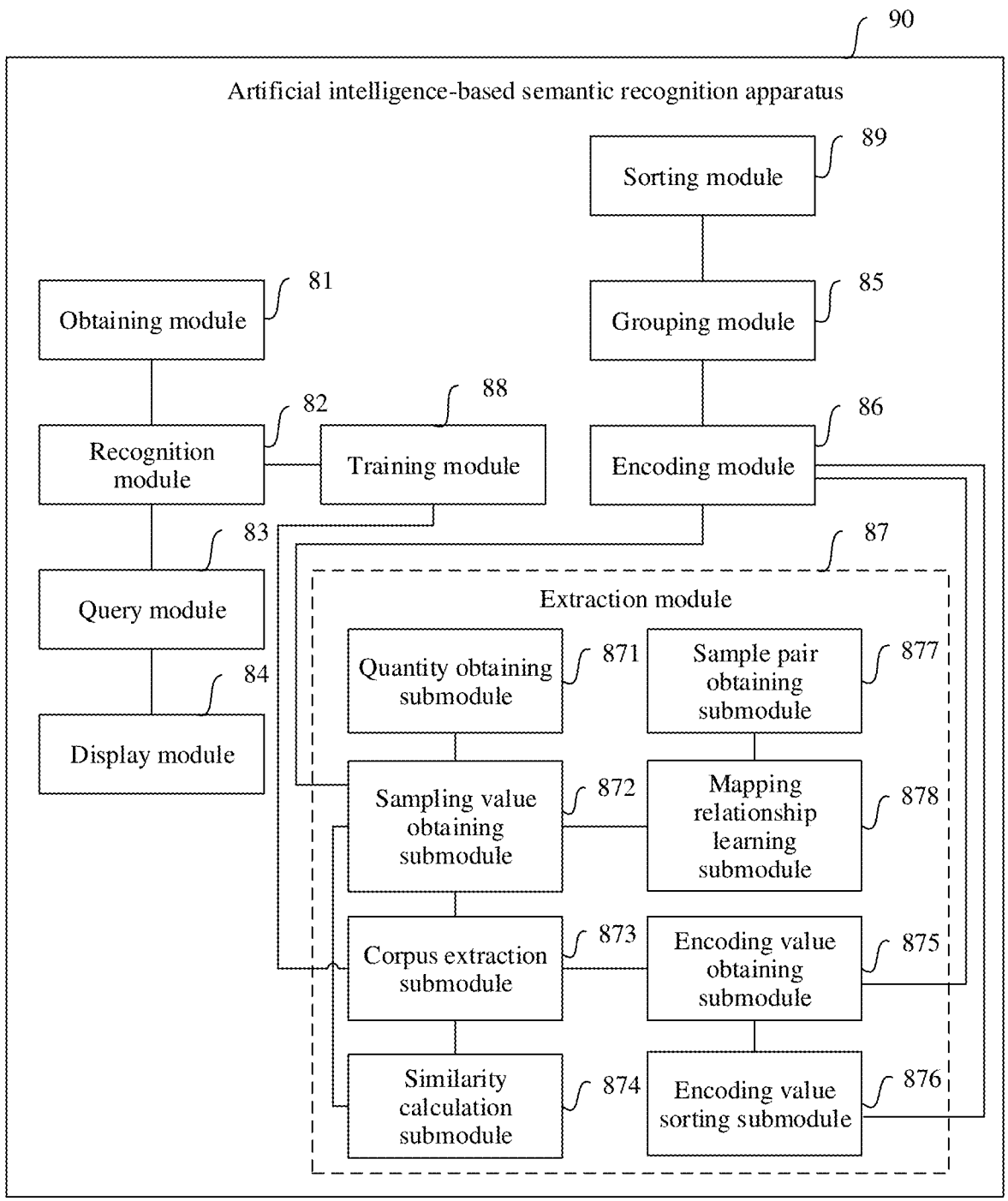
FIG. 9 is a schematic structural diagram of another embodiment of an artificial intelligence-based semantic recognition apparatus.

FIG. 9 is a schematic structural diagram of another embodiment of an artificial intelligence-based semantic recognition apparatus. Compared with the artificial intelligence-based semantic recognition apparatus shown in FIG. 8, a difference lies in that the artificial intelligence-based semantic recognition apparatus 90 shown in FIG. 9 may further include a grouping module 85, an encoding module 86, an extraction module 87, and a training module 88. It should be understood that the artificial intelligence-based semantic recognition apparatus 90 may correspond to the device 900 in FIG. 10. Functions of the obtaining module 81, the recognition module 82, and the query module 83 may be implemented by using a processor 910 in the device 900 in FIG. 10. The display module 84 may correspond to a display unit 970 in the device 900 in FIG. 10. Functions of the grouping module 85, the encoding module 86, the extraction module 87, and the training module 88 may be implemented by using the processor 910 in the device 900 in FIG. 10.

The grouping module 85 is configured to group training corpora based on a quantity of negative corpora that need to be extracted. The quantity of negative corpora that need to be extracted may be independently set based on an implementation requirement and/or system performance in an implementation. This is not limited in this embodiment. Assuming that the quantity of negative corpora that need to be extracted is Num, the training corpora need to be grouped into Num groups, where Num is a positive integer.

The artificial intelligence-based semantic recognition apparatus 80 may further include a sorting module 89.

The sorting module 89 is configured to sort the training corpora before the grouping module 85 groups the training corpora based on the quantity of negative corpora that need to be extracted. The sorting module 89 may sort the training corpora in the following sorting manner sorting the training corpora based on a character string, a hash value of the training corpora, a simhash value of the training corpora, or the like. Further, the sorting module 89 may alternatively sort the training corpora in another sorting manner. This is not limited in this embodiment. In this embodiment, the sorting module 89 sorts the training corpora, so that when the training corpora are completely the same, the encoding value obtained after the grouping does not change with a corpus order, to ensure that the grouping of the training corpora does not change.

The encoding module 86 is configured to encode all groups of training corpora to obtain encoding values of all groups of training corpora. In this embodiment, after the grouping module 85 obtains each group of training corpora through grouping, the encoding module 86 may encode each group of training corpora, so that each group of training corpora has a unique encoding value. An encoding manner may include a manner based on a hash value, a simhash value, or the like. Additionally, another encoding manner may alternatively be used. This is not limited in this embodiment. In an implementation, the encoding module 86 may divide each group of training corpora into words in an N-gram manner, for example, a unigram manner and a bigram manner, then encode the words, and use a calculated simhash value as an encoding value of each group of training corpora.

The extraction module 87 is configured to extract a first-type negative corpus and a second-type negative corpus based on the encoding values obtained by the encoding module 86, where the first-type negative corpus may be a chit-chat negative corpus, and the second-type negative corpus may be a high-frequency positive vocabulary negative corpus.

The training module 88 is configured to perform training by using the training corpora, the first-type negative corpus, and the second-type negative corpus to obtain the semantic recognition model.

In this embodiment, after the grouping module 85 groups the training corpora, the encoding module 86 encodes all groups of training corpora, the extraction module 87 extracts the first-type negative corpus and the second-type negative corpus based on the encoding values, and then the training module 88 performs training by using the training corpora, the first-type negative corpus, and the second-type negative corpus to obtain the semantic recognition model. Therefore, the negative corpus is uniquely extracted based on the encoding value of the training corpus, and a randomized method for generating the negative corpus is changed into a stable generation method. In this way, when the training corpus is not added, deleted, or modified, models obtained through two or more times of training can remain almost the same, and therefore test corpora of a developer have almost same confidence (difference <0.01) in the models obtained through the plurality of times of training, to reduce accuracy fluctuation and improve developer experience.

In this embodiment, the extraction module 87 may include a quantity obtaining submodule 871, a sampling value obtaining submodule 872, and a corpus extraction submodule 873.

The quantity obtaining submodule 871 is configured to obtain a first quantity of first-type negative corpora included in a first negative corpus set, where the first negative corpus set may be a chit-chat negative corpus set, and the first quantity is a total quantity of first-type negative corpora included in the first negative corpus set.

The sampling value obtaining submodule 872 is configured to obtain a first sampling value of the first-type negative corpus based on the encoding values of all groups of training corpora and the first quantity. A first sampling value of the first-type negative corpus may be obtained based on the encoding values of all groups of training corpora and the first quantity in the following manner. The sampling value obtaining submodule 872 obtains a remainder by performing a modulo operation of division by the first quantity by using the encoding values of all groups of training corpora, uses the modulo operation as a mapping relationship, and uses the remainder as the first sampling value. The foregoing descriptions are merely an implementation of obtaining the first sampling value of the first-type negative corpus based on the encoding values of all groups of training corpora and the first quantity. The sampling value obtaining submodule 872 may alternatively obtain the first sampling value of the first-type negative corpus based on the encoding values of all groups of training corpora and the first quantity in another implementation. This is not limited in this embodiment.

The corpus extraction submodule 873 is configured to extract a first-type first negative corpus from the first negative corpus set based on the first sampling value obtained by the sampling value obtaining submodule 872.

The corpus extraction submodule 873 may search the first negative corpus set based on the first sampling value and extract the first negative corpus whose identifier (or index) matches the first sampling value.

The extraction module 87 may further include a similarity calculation submodule 874.

The similarity calculation submodule 874 is configured to: after the corpus extraction submodule 873 extracts the first-type first negative corpus, calculate a first similarity between the first negative corpus and the training corpus. After the corpus extraction submodule 873 extracts the first negative corpus based on the first sampling value, the similarity calculation submodule 874 needs to calculate the first similarity between the first negative corpus and the training corpus. The training corpora herein include all positive corpora, that is, all positive training corpora configured on a model training platform.

The corpus extraction submodule 873 is further configured to: if the first similarity is less than a first similarity threshold, determine that the first negative corpus is successfully sampled, and add the first negative corpus to a sampling corpus set. The first similarity threshold may be independently set based on system performance and/or an implementation requirement in an implementation. The first similarity threshold is not limited in this embodiment.

In this embodiment, the sampling value obtaining submodule 872 is further configured to: after the similarity calculation submodule 874 calculates the first similarity, if the first similarity is greater than or equal to the first similarity threshold, obtain a second sampling value based on the first sampling value. In an implementation, the sampling value obtaining submodule 872 may obtain the second sampling value by adding a preset value to the first sampling value.

The preset value may be independently set based on system performance and/or an implementation requirement in an implementation. The preset value is not limited in this embodiment.

The corpus extraction submodule 873 is further configured to extract a first-type second negative corpus from the first negative corpus set based on the second sampling value obtained by the sampling value obtaining submodule 872. Similarly, the corpus extraction submodule 873 may search the first negative corpus set based on the second sampling value and extract the second negative corpus whose identifier (or index) matches the second sampling value.

The similarity calculation submodule 874 is further configured to calculate a second similarity between the second negative corpus and the training corpus. After the corpus extraction submodule 873 extracts the second negative corpus based on the second sampling value, the similarity calculation submodule 874 needs to calculate the first similarity between the second negative corpus and the training corpus. The training corpora herein include all positive corpora, that is, all positive training corpora configured on the model training platform.

The corpus extraction submodule 873 is further configured to: if the second similarity is less than the first similarity threshold, determine that the second negative corpus is successfully sampled, and add the second negative corpus to the sampling corpus set.

The sampling value obtaining submodule 872 is further configured to: after the similarity calculation submodule 874 calculates the second similarity, if the second similarity is greater than or equal to the first similarity threshold, repeatedly perform a step of obtaining a second sampling value based on the first sampling value and subsequent steps.

The corpus extraction submodule 873 is further configured to: when a quantity of repetition times is greater than a preset threshold of a quantity of repetition times, if a similarity between a negative corpus obtained through current sampling and the training corpus is less than a second similarity threshold, determine that the negative corpus obtained through the current sampling is successfully sampled, and add the negative corpus obtained through the current sampling to the sampling corpus set; or if a similarity between a negative corpus obtained through current sampling and the training corpus is greater than or equal to a second similarity threshold, add the negative corpus successfully sampled last time to the sampling corpus set again.

The preset threshold of a quantity of repetition times may be independently set based on system performance and/or an implementation requirement in an implementation. The preset quantity of repetition times is not limited in this embodiment. For example, the preset quantity of repetition times may be 5.

The second similarity threshold may be independently set based on system performance and/or an implementation requirement in an implementation. The second similarity threshold is not limited in this embodiment, provided that the second similarity threshold is greater than the first similarity threshold.

If a training corpus configured by a developer is similar to a corpus in the first negative corpus set, using the corpus as the negative corpus affects recognition of an intent of the training corpus and confidence in recognizing the intent of the training corpus as a negative intent or a positive intent is low. In this embodiment, a sampling corpus highly similar to the training corpus is eliminated, to avoid impact on the positive intent. In this embodiment, a negative corpus lowly similar to the training corpus may be added to the sampling corpus set, but a negative corpus highly similar to the training corpus is not added to the sampling corpus set.

In this embodiment, the extraction module 87 may include an encoding value obtaining submodule 875, a corpus extraction submodule 873, and an encoding value sorting submodule 876.

The encoding value obtaining submodule 875 is configured to: sequentially obtain every M encoding values from the encoding values; and select a second quantity of encoding values from every M obtained encoding values.

The corpus extraction submodule 873 is configured to extract the second-type negative corpus from a second negative corpus set based on the second quantity of encoding values, where the second negative corpus set may be a high-frequency positive vocabulary negative corpus set, and the second-type negative corpus included in the second negative corpus set may be a high-frequency word.

The encoding value sorting submodule 876 is configured to sort the encoding values.

The encoding value obtaining submodule 875 is further configured to: sequentially obtain every N encoding values from the sorted encoding values; and select a third quantity of encoding values from every N obtained encoding values.

The corpus extraction submodule 873 is further configured to extract the second-type negative corpus from the second negative corpus set based on the third quantity of encoding values, where M and N are positive integers, and M≠N.

M and N may be independently set based on system performance and/or an implementation requirement in an implementation. M and N are not limited in this embodiment. For example, M may be 2, and N may be 3.

Assuming that training corpora are grouped into four groups, and encoding values of the four groups of training corpora are respectively a1, a2, a3, and a4, every two encoding values, that is, a1a2, a2a3, and a3a4, may be sequentially obtained from the encoding values, and then a second quantity of encoding values may be selected from every two obtained encoding values (a1a2, a2a3, and a3a4). Herein, assuming that the second quantity is 2, two groups of encoding values a1a2 and a2a3 may be selected, or two groups of encoding values a1a2 and a3a4 may be selected. This is not limited in this embodiment. Descriptions are provided herein by using an example in which the two groups of encoding values a1a2 and a2a3 are selected. It should be noted that, if the second quantity is 2, the two groups of encoding values a1a2 and a2a3 are selected during the first selection, and therefore the two groups of encoding values a1a2 and a2a3 still need to be selected each time model training is performed subsequently.

Next, the group of encoding values a1a2 is used as an example. The encoding values a1 and a2 are first mapped to a second negative corpus set. A simplest mapping method herein is that a remainder is obtained by performing a modulo operation of division by a total quantity of negative corpora included in the second negative corpus set by using the encoding values. Second negative corpora extracted based on the encoding values a1 and a2 are combined to generate a bigram negative corpus, and the generated bigram negative corpus is used as a second-type negative corpus. Then, the generated bigram negative corpus is added to the negative corpus set required for the training corpus. Similarly, a same method may be used to generate a second-type negative corpus corresponding to a2a3.

Then, a1, a2, a3, and a4 are re-sorted. Assuming that re-sorted encoding values are a2, a1, a3, and a4, every three encoding values, that is, a2a1a3 and a1a3a4, are sequentially obtained from the sorted encoding values, and then a third quantity of encoding values may be obtained from every three obtained encoding values (that is, a2a1a3 and a1a3a4). Herein, assuming that the third quantity is 1, a group of encoding values a2a1a3 may be selected, or a group of encoding values a1a3a4 may be selected. This is not limited in this embodiment. Descriptions are provided herein by using an example in which the group of encoding values a2a1a3 is selected. It should be noted that, if the third quantity is 1, the group of encoding values a2a1a3 is selected during the first selection, and therefore the group of encoding values a2a1a3 still needs to be selected each time model training is performed subsequently.

Next, the encoding values a2, a1, and a3 may be mapped to a second negative corpus set. A simplest mapping method herein is that a remainder is obtained by performing a modulo operation of division by a total quantity of negative corpora included in the second negative corpus set by using the encoding values. Second negative corpora extracted based on the encoding values a2, a1, and a3 are combined to generate a trigram negative corpus, and the generated trigram negative corpus is used as a second-type negative corpus. Then, the generated trigram negative corpus is added to the negative corpus set required for the training corpus. Herein, a1, a2, a3, and a4 are re-sorted, so that the generated trigram negative corpus does not include the generated bigram negative corpus.

In this embodiment, the extraction module 87 may include a sampling value obtaining submodule 872 and a corpus extraction submodule 873.

The sampling value obtaining submodule 872 is configured to obtain a third sampling value of the first-type negative corpus and a fourth sampling value of the second-type negative corpus based on the encoding values of all groups of training corpora and a pre-learned mapping relationship, where the pre-learned mapping relationship may include a modulo operation. This is not limited in this embodiment.

The corpus extraction submodule 873 is configured to: extract the first-type negative corpus from a first negative corpus set based on the third sampling value obtained by the sampling value obtaining submodule 872 and extract the second-type negative corpus from a second negative corpus set based on the fourth sampling value.

Further, the extraction module 87 may further include a sample pair obtaining submodule 877 and a mapping relationship learning submodule 878.

The sample pair obtaining submodule 877 is configured to obtain a training sample pair before the sampling value obtaining submodule 872 obtains the third sampling value of the first-type negative corpus, where the training sample pair includes an encoding value of a training corpus and a sampling value of a corresponding negative corpus, and a distance between sampling values of negative corpora corresponding to training corpora meets a preset constraint distance.

The mapping relationship learning submodule 878 is configured to learn a mapping relationship by using the training sample pair, where the mapping relationship includes a mapping relationship between the encoding value of the training corpus and the sampling value of the corresponding negative corpus.

The artificial intelligence-based semantic recognition apparatus provided in the embodiment shown in FIG. 9 may be configured to perform the solutions in the method embodiments shown in FIG. 3 to FIG. 6. For an implementation principle of the artificial intelligence-based semantic recognition apparatus, further refer to the related descriptions in the method embodiments.

It should be understood that division into the modules of the artificial intelligence-based semantic recognition apparatus shown in FIG. 8 and FIG. 9 is merely logical function division. In an actual implementation, all or some of the modules may be integrated into a physical entity or may be physically separated. In addition, all of the modules may be implemented in a form of software invoked by a processing element or in a form of hardware. Alternatively, some of the modules may be implemented in a form of software invoked by a processing element or in a form of hardware. For example, the module may be a separately disposed processing element, or may be integrated into a chip of an electronic device for implementation. An implementation of another module is similar to the implementation of the module. In addition, all or some of the modules may be integrated together or may be implemented independently. In an implementation process, steps in the foregoing methods or the foregoing modules may be implemented by using a hardware integrated logical circuit in the processing element, or by using instructions in a form of software.

For example, the foregoing modules may be configured as one or more integrated circuits for implementing the foregoing method, for example, one or more application-specific integrated circuits (ASICs), one or more digital signal processors (DSPs), or one or more field programmable gate arrays (FPGAs). For another example, the modules may be integrated together, and implemented in a form of a system-on-a-chip (SOC).

Figure 10:
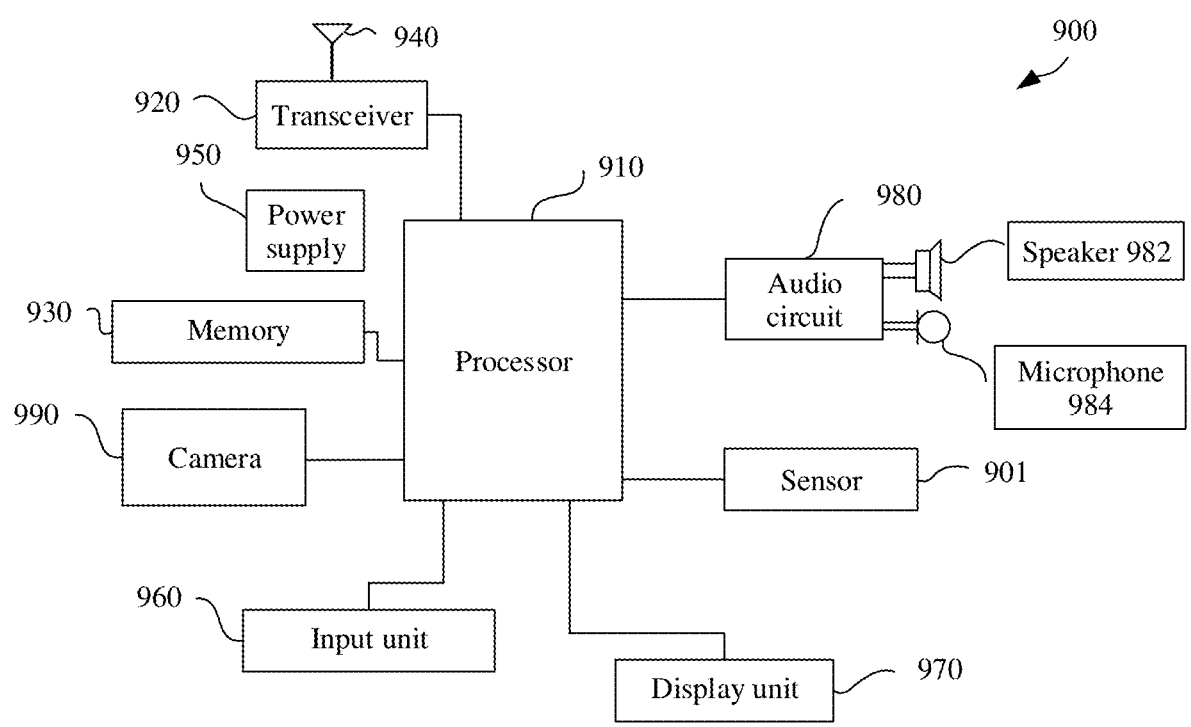
FIG. 10 is a schematic structural diagram of an embodiment of an artificial intelligence-based semantic recognition device.

FIG. 10 is a schematic structural diagram of an embodiment of an artificial intelligence-based semantic recognition device. The artificial intelligence-based semantic recognition device may include a display, one or more processors, a memory, a plurality of application programs, and one or more computer programs.

The display may include a display of a vehicle-mounted computer (Mobile Data Center). The artificial intelligence-based semantic recognition device may be a device such as a cloud server, a mobile terminal (mobile phone), a smart screen, an unmanned aerial vehicle, an intelligent connected vehicle (ICV), a smart/intelligent car, or a vehicle-mounted device.

The one or more computer programs are stored in the memory, the one or more computer programs include instructions, and when the instructions are executed by the device, the device is enabled to perform the following steps: obtaining a query statement entered by a user;
  recognizing the query statement by using a pre-trained semantic recognition model, to obtain an intent of the query statement, where the pre-trained semantic recognition model is trained by using a training corpus and a negative corpus, and the negative corpus is extracted by mapping an encoding value of the training corpus to a negative corpus set;
  obtaining, based on the query statement and the intent of the query statement, a response corresponding to the query statement; and
  displaying the response corresponding to the query statement.

In a possible implementation, when the instructions are executed by the device, the device is enabled to perform the following steps:
  obtaining a query statement entered by the user by using a text;
  obtaining a query statement entered by the user by using a voice; or
  obtaining a picture entered by the user and recognizing the picture to obtain a query statement included in the picture.

In a possible implementation, when the instructions are executed by the device, the device is enabled to perform the following steps:
  grouping training corpora based on a quantity of negative corpora that need to be extracted;
  coding all groups of training corpora to obtain encoding values of all groups of training corpora;
  extracting a first-type negative corpus and a second-type negative corpus based on the encoding values; and
  performing training by using the training corpora, the first-type negative corpus, and the second-type negative corpus to obtain the semantic recognition model.

In a possible implementation, when the instructions are executed by the device, the device is enabled to perform the following steps:
  obtaining a first quantity of first-type negative corpora included in a first negative corpus set;
  obtaining a first sampling value of the first-type negative corpus based on the encoding values of all groups of training corpora and the first quantity; and
  extracting a first-type first negative corpus from the first negative corpus set based on the first sampling value.

In a possible implementation, when the instructions are executed by the device, the device is enabled to perform the following steps: after extracting the first-type first negative corpus from the first negative corpus set based on the first sampling value, calculating a first similarity between the first negative corpus and the training corpus; and
  if the first similarity is less than a first similarity threshold, determining that the first negative corpus is successfully sampled, and adding the first negative corpus to a sampling corpus set.

In a possible implementation, when the instructions are executed by the device, the device is enabled to perform the following steps: after calculating the first similarity between the first negative corpus and the training corpus, if the first similarity is greater than or equal to the first similarity threshold, obtaining a second sampling value based on the first sampling value;
  extracting a first-type second negative corpus from the first negative corpus set based on the second sampling value;

calculating a second similarity between the second negative corpus and the training corpus; and if the second similarity is less than the first similarity threshold, determining that the second negative corpus is successfully sampled, and adding the second negative corpus to the sampling corpus set.

In a possible implementation, when the instructions are executed by the device, the device is enabled to perform the following steps: after calculating the second similarity between the second negative corpus and the training corpus, if the second similarity is greater than or equal to the first similarity threshold, repeatedly performing a step of obtaining a second sampling value based on the first sampling value and subsequent steps; and when a quantity of repetition times is greater than a preset threshold of a quantity of repetition times, if a similarity between a negative corpus obtained through current sampling and the training corpus is less than a second similarity threshold, determining that the negative corpus obtained through the current sampling is successfully sampled, and adding the negative corpus obtained through the current sampling to the sampling corpus set; or if a similarity between a negative corpus obtained through current sampling and the training corpus is greater than or equal to a second similarity threshold, adding the negative corpus successfully sampled last time to the sampling corpus set again.

In a possible implementation, when the instructions are executed by the device, the device is enabled to perform the following steps: sequentially obtaining every M encoding values from the encoding values;

selecting a second quantity of encoding values from every M obtained encoding values;

extracting the second-type negative corpus from a second negative corpus set based on the second quantity of encoding values;

sorting the encoding values;

sequentially obtaining every N encoding values from the sorted encoding values;

selecting a third quantity of encoding values from every N obtained encoding values; and extracting the second-type negative corpus from the second negative corpus set based on the third quantity of encoding values, where M and N are positive integers, and M N.

In a possible implementation, when the instructions are executed by the device, the device is enabled to perform the following steps: obtaining a third sampling value of the first-type negative corpus and a fourth sampling value of the second-type negative corpus based on the encoding values of all groups of training corpora and a pre-learned mapping relationship; and extracting the first-type negative corpus from a first negative corpus set based on the third sampling value and extracting the second-type negative corpus from a second negative corpus set based on the fourth sampling value.

In a possible implementation, when the instructions are executed by the device, the device is enabled to perform the following steps: obtaining a training sample pair before obtaining the third sampling value of the first-type negative corpus and the fourth sampling value of the second-type negative corpus based on the encoding values of all groups of training corpora and the pre-learned mapping relationship, where the training sample pair includes an encoding value of a training corpus and a sampling value of a corresponding negative corpus, and a distance between sampling values of negative corpora corresponding to training corpora meets a preset constraint distance; and learning a mapping relationship by using the training sample pair, where the mapping relationship includes a mapping relationship between the encoding value of the training corpus and the sampling value of the corresponding negative corpus.

The artificial intelligence-based semantic recognition device shown in FIG. 10 may be an electronic device or may be a circuit device built in the electronic device. The electronic device may be a device such as a cloud server, a mobile terminal (a mobile phone), a smart screen, an unmanned aerial vehicle, an ICV, a smart/intelligent car, or a vehicle-mounted device.

The artificial intelligence-based semantic recognition device may be configured to perform functions/steps in the methods provided in the embodiments shown in FIG. 3 to FIG. 7.

As shown in FIG. 10, the artificial intelligence-based semantic recognition device 900 includes a processor 910 and a transceiver 920. Optionally, the artificial intelligence-based semantic recognition device 900 may further include a memory 930. The processor 910, the transceiver 920, and the memory 930 may communicate with each other through an internal connection path to transfer a control signal and/or a data signal. The memory 930 is configured to store a computer program. The processor 910 is configured to: invoke and run the computer program in the memory 930.

Optionally, the artificial intelligence-based semantic recognition device 900 may further include an antenna 940, configured to send a wireless signal that is output by the transceiver 920.

The processor 910 and the memory 930 may be integrated into one processing apparatus, or more commonly, components independent of each other. The processor 910 is configured to execute program encode stored in the memory 930 to implement the foregoing functions. In an implementation, the memory 930 may also be integrated into the processor 910 or may be independent of the processor 910.

In addition, the artificial intelligence-based semantic recognition device 900 may further include one or more of an input unit 960, a display unit 970, an audio circuit 980, a camera 990, a sensor 901, and the like, to improve the functions of the artificial intelligence-based semantic recognition device 900. The audio circuit may further include a speaker 982, a microphone 984, and the like. The display unit 970 may include a display.

Optionally, the artificial intelligence-based semantic recognition device 900 may further include a power supply 950, configured to supply power to various components or circuits in the artificial intelligence-based semantic recognition device 900.

It should be understood that the artificial intelligence-based semantic recognition device 900 shown in FIG. 10 can implement processes of the methods provided in the embodiments shown in FIG. 3 to FIG. 7. The operations and/or the functions of the modules in the artificial intelligence-based semantic recognition device 900 are intended to implement corresponding procedures in the foregoing method embodiments. For details, refer to the descriptions in the method embodiments shown in FIG. 3 to FIG. 7. To avoid repetition, detailed descriptions are properly omitted herein.

It should be understood that the processor 910 in the artificial intelligence-based semantic recognition device 900 shown in FIG. 10 may be a system-on-a-chip (SOC), and the processor 910 may include a central processing unit (CPU), and may further include another type of processor, for example, a graphics processing unit (GPU).

In conclusion, some processors or processing units in the processor 910 may work together to implement the foregoing method procedure, and software programs corresponding to the processors or processing units may be stored in the memory 930.

In the foregoing embodiments, the processor may include, for example, a CPU, a DSP, a microcontroller, or a digital signal processor, and may further include a GPU, an embedded neural-network processing unit (NPU), and an image signal processor (ISP). The processor may further include a necessary hardware accelerator or logic processing hardware circuit, for example, an ASIC, or one or more integrated circuits configured to control program execution. In addition, the processor may have functions of operating one or more software programs. The software programs may be stored in a storage medium.

An embodiment further provides a computer-readable storage medium. The computer-readable storage medium stores a computer program. When the computer program is run on a computer, the computer is enabled to perform the method provided in the embodiment shown in FIG. 3, FIG. 4A and FIG. 4B, FIG. 5, FIG. 6, or FIG. 7.

An embodiment further provides a computer program product. The computer program product includes a computer program. When the computer program product runs on a computer, the computer is enabled to perform the method provided in the embodiment shown in FIG. 3, FIG. 4A and FIG. 4B, FIG. 5, FIG. 6, or FIG. 7.

In this embodiment, "at least one" means one or more, and "a plurality or means two or more. The term "and/or" describes an association relationship for describing associated objects and represents that three relationships may exist. For example, A and/or B may represent: Only A exists, both A and B exist, and only B exists. A and B may be in a singular form or a plural form. The character "/" usually indicates an "or" relationship between the associated objects. "At least one of" the following" and a similar expression thereof indicates any combination of the following, including any combination of one or more of the following. For example, at least one of a, b, and c may indicate a, b, c, a and b, a and c, b and c, or a, b, and c, where a, b, and c may be singular or plural.

A person of ordinary skill in the art may be aware that units, algorithms, and steps described in the embodiments can be implemented by electronic hardware or a combination of computer software and electronic hardware. Whether the functions are performed by hardware or software depends on particular applications and design constraints of the solutions. A person skilled in the art may use different methods to implement the described functions for each particular application, but it should not be considered that the implementation goes beyond the scope.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments, when any of the functions is implemented in a form of a software functional unit and sold or used as an independent product, the function may be stored in a computer-readable storage medium. Based on such an understanding, the solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes: any medium that can store program encode, such as a USB flash drive, a removable hard disk, a read-only memory (ROM), a random access memory (RAM), a magnetic disk, or an optical disc.

The foregoing descriptions are merely implementations. Any variation or replacement readily figured out by a person skilled in the art is envisioned to be within the scope of the embodiments.

What is claimed is:

1. An artificial intelligence-based semantic recognition method, comprising:
    obtaining a query statement entered by a user;
    recognizing the query statement by using a pre-trained semantic recognition model, to obtain an intent of the query statement, wherein the pre-trained semantic recognition model is trained by using a training corpus and a negative corpus, and the negative corpus is extracted by mapping an encoding value of the training corpus to a negative corpus set, comprising one of:
    matching the encoding value to the negative corpus in the negative corpus set based on a mapping relationship between the encoding value of the training corpus and a sampling value of the negative corpus, and newly assigning the encoding value to the negative corpus in the negative corpus set and creating the mapping relationship;
    obtaining, based on the query statement and the intent of the query statement, a response corresponding to the query statement; and
    displaying the response corresponding to the query statement.

2. The artificial intelligence-based semantic recognition method according to claim 1, wherein obtaining the query statement entered by a user further comprises:
    obtaining the query statement entered by the user by using a text;
    obtaining the query statement entered by the user by using a voice; or
    obtaining a picture entered by the user and recognizing the picture to obtain a query statement comprised in the picture.

3. The artificial intelligence-based semantic recognition method according to claim 1, wherein the training process of the semantic recognition model further comprises:
    grouping training corpora based on a quantity of negative corpora that need to be extracted;
    coding all groups of training corpora to obtain encoding values of all groups of training corpora;
    extracting a first-type negative corpus and a second-type negative corpus based on the encoding values; and
    performing training by using the training corpora, the first-type negative corpus, and the second-type negative corpus to obtain the semantic recognition model.

4. The artificial intelligence-based semantic recognition method according to claim 3, wherein extracting the first-type negative corpus based on the encoding values further comprises:
    obtaining a first quantity of first-type negative corpora comprised in a first negative corpus set;
    obtaining a first sampling value of the first-type negative corpus based on the encoding values of all groups of training corpora and the first quantity; and extracting a first-type first negative corpus from the first negative corpus set based on the first sampling value.

5. The artificial intelligence-based semantic recognition method according to claim 4, wherein, after extracting the first-type first negative corpus from the first negative corpus set based on the first sampling value, the method further comprises:
    calculating a first similarity between the first negative corpus and the training corpus; and
    when the first similarity is less than a first similarity threshold, determining that the first negative corpus is successfully sampled, and adding the first negative corpus to a sampling corpus set.

6. The artificial intelligence-based semantic recognition method according to claim 5, wherein, after calculating the first similarity between the first negative corpus and the training corpus, the method further comprises:
    when the first similarity is greater than or equal to the first similarity threshold, obtaining a second sampling value based on the first sampling value;
    extracting a first-type second negative corpus from the first negative corpus set based on the second sampling value;
    calculating a second similarity between the second negative corpus and the training corpus; and
    when the second similarity is less than the first similarity threshold, determining that the second negative corpus is successfully sampled, and adding the second negative corpus to the sampling corpus set.

7. The artificial intelligence-based semantic recognition method according to claim 6, wherein, after calculating the second similarity between the second negative corpus and the training corpus, the method further comprises:
    when the second similarity is greater than or equal to the first similarity threshold, repeatedly performing a step of obtaining a second sampling value based on the first sampling value and subsequent steps; and
    when a quantity of repetition times is greater than a preset threshold of a quantity of repetition times and a similarity between a negative corpus obtained through current sampling and the training corpus is less than a second similarity threshold, determining that the negative corpus obtained through the current sampling is successfully sampled, and adding the negative corpus obtained through the current sampling to the sampling corpus set; or
    when a similarity between the negative corpus obtained through current sampling and the training corpus is greater than or equal to the second similarity threshold, adding the negative corpus successfully sampled last time to the sampling corpus set again.

8. The artificial intelligence-based semantic recognition method according to claim 3, wherein extracting the second-type negative corpus based on the encoding values further comprises:
    sequentially obtaining every M encoding values from the encoding values;
    selecting a second quantity of encoding values from every M obtained encoding values;
    extracting the second-type negative corpus from a second negative corpus set based on the second quantity of encoding values;
    sorting the encoding values;
    sequentially obtaining every N encoding values from the sorted encoding values;
    selecting a third quantity of encoding values from every N obtained encoding values; and
    extracting the second-type negative corpus from the second negative corpus set based on the third quantity of encoding values, wherein M and N are positive integers, and M≠N.

9. The artificial intelligence-based semantic recognition method according to claim 3, wherein, extracting the first-type negative corpus and a second-type negative corpus based on the encoding values further comprises:
    obtaining a third sampling value of the first-type negative corpus and a fourth sampling value of the second-type negative corpus based on the encoding values of all groups of training corpora and a pre-learned mapping relationship; and
    extracting the first-type negative corpus from a first negative corpus set based on the third sampling value; and
    extracting the second-type negative corpus from a second negative corpus set based on the fourth sampling value.

10. The artificial intelligence-based semantic recognition method according to claim 9, wherein, before obtaining the third sampling value of the first-type negative corpus and the fourth sampling value of the second-type negative corpus based on the encoding values of all groups of training corpora and the pre-learned mapping relationship, the method further comprises:
    obtaining a training sample pair, wherein the training sample pair comprises an encoding value of a training corpus and a sampling value of a corresponding negative corpus, and a distance between sampling values of negative corpora corresponding to training corpora meets a preset constraint distance; and
    learning a mapping relationship by using the training sample pair, wherein the mapping relationship comprises a mapping relationship between the encoding value of the training corpus and the sampling value of the corresponding negative corpus.

11. An artificial intelligence-based semantic recognition device, comprising:
    a display;
    one or more processors;
    a memory;
    a plurality of application programs; and
    one or more computer programs, wherein the one or more computer programs are stored in the memory and comprise instructions, and, when the instructions are executed by the device, the device is configured to perform the following steps:
    obtaining a query statement entered by a user;
    recognizing the query statement by using a pre-trained semantic recognition model, to obtain an intent of the query statement, wherein the pre-trained semantic recognition model is trained by using a training corpus and a negative corpus, and the negative corpus is extracted by mapping an encoding value of the training corpus to a negative corpus set, comprising one of: matching the encoding value to the negative corpus in the negative corpus set based on a mapping relationship between the encoding value of the training corpus and a sampling value of the negative corpus, and newly assigning the encoding value to the negative corpus in the negative corpus set and creating the mapping relationship;
    obtaining, based on the query statement and the intent of the query statement, a response corresponding to the query statement; and
    displaying the response corresponding to the query statement.

12. The artificial intelligence-based semantic recognition device according to claim 11, wherein when the instructions are executed by the device, the device is configured to perform the following steps:
- obtaining a query statement entered by the user by using a text;
- obtaining a query statement entered by the user by using a voice; or
- obtaining a picture entered by the user and recognizing the picture to obtain a query statement comprised in the picture.

13. The artificial intelligence-based semantic recognition device according to claim 11, wherein when the instructions are executed by the device, the device is configured to perform the following steps:
- grouping training corpora based on a quantity of negative corpora that need to be extracted;
- coding all groups of training corpora to obtain encoding values of all groups of training corpora;
- extracting a first-type negative corpus and a second-type negative corpus based on the encoding values; and
- performing training by using the training corpora, the first-type negative corpus, and the second-type negative corpus to obtain the semantic recognition model.

14. The artificial intelligence-based semantic recognition device according to claim 13, wherein extracting the first-type negative corpus based on the encoding values further comprises:
- obtaining a first quantity of first-type negative corpora comprised in a first negative corpus set;
- obtaining a first sampling value of the first-type negative corpus based on the encoding values of all groups of training corpora and the first quantity; and
- extracting a first-type first negative corpus from the first negative corpus set based on the first sampling value.

15. The artificial intelligence-based semantic recognition device according to claim 14, wherein, after extracting the first-type first negative corpus from the first negative corpus set based on the first sampling value, the device is further configured to perform:
- calculating a first similarity between the first negative corpus and the training corpus; and
- when the first similarity is less than a first similarity threshold, determining that the first negative corpus is successfully sampled, and adding the first negative corpus to a sampling corpus set.

16. The artificial intelligence-based semantic recognition device according to claim 15, wherein, after calculating the first similarity between the first negative corpus and the training corpus, the device is further configured to perform:
- when the first similarity is greater than or equal to the first similarity threshold, obtaining a second sampling value based on the first sampling value;
- extracting a first-type second negative corpus from the first negative corpus set based on the second sampling value;
- calculating a second similarity between the second negative corpus and the training corpus; and
- when the second similarity is less than the first similarity threshold, determining that the second negative corpus is successfully sampled, and adding the second negative corpus to the sampling corpus set.

17. The artificial intelligence-based semantic recognition device according to claim 16, wherein, after calculating the second similarity between the second negative corpus and the training corpus, the device is further configured to perform:
- when the second similarity is greater than or equal to the first similarity threshold, repeatedly performing a step of obtaining a second sampling value based on the first sampling value and subsequent steps a quantity of repetition times is greater than a preset threshold of a quantity of repetition times, a similarity between a negative corpus obtained through current sampling and the training corpus is less than a second similarity threshold, determining that the negative corpus obtained through the current sampling is successfully sampled, and adding the negative corpus obtained through the current sampling to the sampling corpus set; or
- when a similarity between the negative corpus obtained through current sampling and the training corpus is greater than or equal to the second similarity threshold, adding the negative corpus successfully sampled last time to the sampling corpus set again.

18. The artificial intelligence-based semantic recognition device according to claim 13, wherein extracting the second-type negative corpus based on the encoding values further comprises:
- sequentially obtaining every M encoding values from the encoding values;
- selecting a second quantity of encoding values from every M obtained encoding values;
- extracting the second-type negative corpus from a second negative corpus set based on the second quantity of encoding values;
- sorting the encoding values;
- sequentially obtaining every N encoding values from the sorted encoding values;
- selecting a third quantity of encoding values from every N obtained encoding values; and
- extracting the second-type negative corpus from the second negative corpus set based on the third quantity of encoding values, wherein M and N are positive integers, and M/N.

19. The artificial intelligence-based semantic recognition device according to claim 13, wherein extracting the first-type negative corpus and a second-type negative corpus based on the encoding values further comprises:
- obtaining a third sampling value of the first-type negative corpus and a fourth sampling value of the second-type negative corpus based on the encoding values of all groups of training corpora and a pre-learned mapping relationship; and
- extracting the first-type negative corpus from a first negative corpus set based on the third sampling value; and
- extracting the second-type negative corpus from a second negative corpus set based on the fourth sampling value.

20. A non-transitory computer-readable storage medium, wherein the non-transitory computer-readable storage medium stores a computer program, and when the computer program is run on a computer, the computer is configured to perform the following steps:
- obtaining a query statement entered by a user;
- recognizing the query statement by using a pre-trained semantic recognition model, to obtain an intent of the query statement, wherein the pre-trained semantic recognition model is trained by using a training corpus and a negative corpus, and the negative corpus is extracted by mapping an encoding value of the training corpus to a negative corpus set, comprising one of: matching the encoding value to the negative corpus in the negative corpus set based on a mapping relationship between the encoding value of the training corpus and a sampling value of the negative corpus, and newly assigning the encoding value to the negative corpus in the negative corpus set and creating the mapping relationship;

obtaining, based on the query statement and the intent of the query statement, a response corresponding to the query statement; and displaying the response corresponding to the query statement.

* * * * *